(12) United States Patent
Tsuruta et al.

(10) Patent No.: US 9,016,340 B2
(45) Date of Patent: Apr. 28, 2015

(54) PNEUMATIC TIRE

(75) Inventors: Makoto Tsuruta, Akishima (JP);
Masashi Yamaguchi, Kodaira (JP);
Atsushi Miyasaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 314 days.

(21) Appl. No.: 12/671,463

(22) PCT Filed: Jul. 30, 2008

(86) PCT No.: PCT/JP2008/063692
§ 371 (c)(1),
(2), (4) Date: Mar. 22, 2010

(87) PCT Pub. No.: WO2009/017165
PCT Pub. Date: Feb. 5, 2009

(65) Prior Publication Data
US 2010/0193102 A1    Aug. 5, 2010

(30) Foreign Application Priority Data

Jul. 30, 2007 (JP) .................................. 2007-198175
Jul. 30, 2007 (JP) .................................. 2007-198182

(51) Int. Cl.
*B60C 13/00* (2006.01)
*B60C 13/02* (2006.01)
*B60C 17/00* (2006.01)

(52) U.S. Cl.
CPC ............. *B60C 13/02* (2013.01); *B60C 17/0009* (2013.04)

(58) Field of Classification Search
None
See application file for complete search history.

(56) References Cited

U.S. PATENT DOCUMENTS

| 4,144,921 | A | * | 3/1979 | Yabuta et al. | 152/154.2 |
| 4,405,007 | A | | 9/1983 | Welter | |
| 4,669,519 | A | * | 6/1987 | Togashi et al. | 152/454 |
| 5,318,089 | A | * | 6/1994 | Tagashira et al. | 152/544 |
| 5,538,059 | A | * | 7/1996 | Brayer | 152/154.1 |
| 5,645,660 | A | * | 7/1997 | Attinello et al. | 152/523 |
| D386,136 | S | * | 11/1997 | Ratliff, Jr. | D12/605 |
| 2007/0074801 | A1 | * | 4/2007 | Agostini et al. | 152/525 |
| 2009/0032161 | A1 | | 2/2009 | Yamaguchi | |

FOREIGN PATENT DOCUMENTS

| DE | 9209224 | * | 11/1993 |
| JP | 54-13106 | | 1/1979 |
| JP | 2-147418 A | | 6/1990 |
| JP | 4-238703 A | | 8/1992 |

(Continued)

OTHER PUBLICATIONS

Machine translation of JP 8-282218, 1996.*

(Continued)

*Primary Examiner* — Justin Fischer
(74) *Attorney, Agent, or Firm* — Sughrue Mion, PLLC

(57) ABSTRACT

The present invention includes a run-flat tire 1 comprising a plurality of turbulence generation ridges 20 which extend on a surface of a tire side portion 3 in a tire-radial direction and which are arranged at a pitch in a tire-circumferential direction and relationship Si>So is satisfied. Si is the sum of sidewall areas of all the turbulence generation ridges located at the inner side, in the tire-radial direction, of a maximum width position of the pneumatic tire. So is the sum of sidewall areas of all the turbulence generation ridges located at the outer side, in the tire-radial direction, of the tire maximum width position.

20 Claims, 15 Drawing Sheets

(56) References Cited

FOREIGN PATENT DOCUMENTS

| | | | |
|---|---|---|---|
| JP | 7-164831 | * | 6/1995 |
| JP | 8-258518 A | | 10/1996 |
| JP | 8-282218 | * | 10/1996 |
| JP | 8-282218 A | | 10/1996 |
| JP | 2002-331595 | * | 11/2002 |
| JP | 2007-176304 A | | 7/2007 |
| JP | 2008-68716 A | | 3/2008 |
| JP | 2008-222007 A | | 9/2008 |
| WO | 2007/032405 A1 | | 3/2007 |

OTHER PUBLICATIONS

Translation of JP 8-282218, 1996.*
Machine translation of JP 2002-331595, 2002.*
Machine translation of JP 7-164831, 1995.*
Machine translation of DE 9209224, 1993.*
International Search Report dated Nov. 11, 2008, 4 pages.
Japanese Office Action issued in the counterpart Japanese Application No. 2007-198182 dated May 22, 2012.

* cited by examiner

PNEUMATIC TIRE

CROSS REFERENCE TO RELATED APPLICATIONS

This application is a National Stage of International Application No. PCT/JP2008/063692 filed Jul. 30, 2008, claiming priority based on Japanese Patent Application Nos. 2007-198175 and 2007-198182 both filed on Jul. 30, 2007, the contents of all of which are incorporated herein by reference in their entirety.

TECHNICAL FIELD

The invention relates to a pneumatic tire with a heat-dissipation function.

BACKGROUND ART

Generally, rise in temperature of a pneumatic tire is not favorable in view of the durability because the temperature rise accelerates over-time changes such as the changes in the properties of a material for the pneumatic tire or causes a break of a tread thereof during a high speed run. Lowering the temperature of the tire has been a significant desideratum to improve the durability especially for a run-flat tire in a case where a passenger vehicle with the run-flat tire is running while the run-flat tire is punctured (running with a 0-kPa internal pressure). For example, if a run-flat tire that has a crescent-shaped reinforcement rubber is running while being punctured, deformation in radial direction concentrates on the reinforcement rubber. This raises the temperature of this portion to a very high temperature, thereby affecting significantly the durability.

An example of means for lowering tire temperature to address the above problem is that in which heat generation is suppressed by use of a reinforcement member designed to reduce or suppress the distortion of tire components (e.g., carcass plies). In this case, however, the use of the reinforcement member may exert adverse effects on the ordinary performances of the tire. Such adverse effects include occurrence of unpredictable failures, and deterioration in ride comfort especially when the reinforcement member is used in a run-flat tire. The deterioration in ride comfort of the ran-flat tire is due to higher vertical spring (bouncing in the vertical direction) during a run with tires of normal internal pressures. What is needed accordingly is new means for lowering tire temperature without sacrificing normal performances of the tire.

In an example of such new means for lowering tire temperature (see WO 2007/032405), the cooling effect is improved by forming turbulence generation ridges extending in the radial direction of the tire in tire side portions and by causing the turbulence generation ridges to generate or accelerate turbulence of higher flow speed on the surface of the tire. Rubber, which tires are made of, is a material of poor heat conductivity. So, it is a known fact that the cooling effect by accelerating the turbulence generation is more effective than the cooling effect by expanding the heat-dissipating area.

It turns out, however, that if the turbulence generation ridges are arranged in high density to cover the entire surface of the tire side portions, the tire becomes heavier and has an increased travelling resistance due to a somewhat larger resistance of air caused by the turbulence generation ridges.

Accordingly, an object of the invention is providing a pneumatic tire capable of preventing both the tire weight and the travelling resistance from increasing while maintaining the effect to lower the temperature of tire side portions to a high level.

DISCLOSURE OF THE INVENTION

A first aspect of the invention is summarized as a pneumatic tire (pneumatic tire 1) including a plurality of turbulence generation ridges (turbulence generation ridges 20) which extend on a surface of a tire side portion (tire side portion 3) in a tire-radial direction and which are arranged at a pitch in a tire-circumferential direction, wherein a relationship Si>So is satisfied where Si is the sum of sidewall areas of all the turbulence generation ridges located at the inner side, in the tire-radial direction, of a maximum width position (Wmax) and So is the sum of sidewall areas of all the turbulence generation ridges located at the outer side, in the tire-radial direction, of the tire maximum width position.

With the above aspect, since the relationship Si>So is satisfied, the turbulence generation ridges are arranged more densely on the inner side in the tire-radial direction than on the outer side in the tire-radial direction. Accordingly, cooling effect on the temperature of the tire side portions can be kept to a high level while the increases in the tire weight and the travelling resistance can be suppressed.

A second aspect of the invention depends on the first aspect of the invention and is summarized in that the number of the turbulence generation ridges located at the inner side, in the tire-radial direction, of the tire maximum width position is larger than the number of the turbulence generation ridges located at the outer side, in the tire-radial direction, of the tire maximum width position.

A third aspect of the invention depends on any of the first and second aspects of the invention and is summarized in that the turbulence generation ridges located at the inner side, in the tire-radial direction, of the tire maximum width position are equidistantly arranged in the tire-circumferential direction.

A fourth aspect of the invention depends on the third aspect of the invention and is summarized in that the turbulence generation ridges located at the inner side, in the tire-radial direction, of the tire maximum width position and equidistantly arranged in the tire-circumferential direction satisfy $1.0 \leq p/h \leq 50.0$ where h is a maximum height of each of the turbulence generation ridges from the surface of the tire side portion, and p is a pitch between positions of each adjacent two of the turbulence generation ridges, the positions each being a point having the maximum height h.

A fifth aspect of the invention depends on the first to fourth aspects of the invention and is summarized in that a largest area of a portion which is in a region located in the surface of the tire side portion and located at the outer side, in the tire-radial direction, of the tire maximum width position, and in which no turbulence generation ridges are formed is an area having an angle of 90° or smaller around a tire rolling axis.

A sixth aspect of the invention depends on the first to fifth aspects of the invention and is summarized in that at least one of an end portion, on the inner side in the tire-radial direction, of each turbulence generation ridge and an end portion, on the outer side in the tire-radial direction, of the turbulence generation ridge is formed to have a height gradually decreasing toward the at least one end portion.

A seventh aspect of the invention depends on the sixth aspect of the invention and is summarized in that a top surface of the end portion of each of the turbulence generation ridges is formed as a sloping surface that is sloping with respect to the surface of the tire side portion.

A eighth aspect of the invention depends on the seventh aspect of the invention and is summarized in that an angle formed by a tangent to the sloping surface and the surface of the tire side portion is within a range from 10° to 40°.

A ninth aspect of the invention depends on the first to eighth aspects of the invention and is summarized in that a maximum height of each of the turbulence generation ridges is within a range from 1 mm to 5 mm measured from the surface of the tire side portion.

A tenth aspect of the invention depends on the first to ninth aspects of the invention and is summarized in that the tire side portion includes a reinforcement rubber (sidewall-reinforcement layer 8) that has a crescent-shaped cross-section taken in the tire-radial direction.

BRIEF DESCRIPTION OF THE DRAWINGS

FIG. 15($b$) is a perspective view illustrating a principal portion showing Modified Example 1 of the turbulence generation ridge.

BEST MODE FOR CARRYING OUT THE INVENTION

[Embodiment 1]

Figure 1:
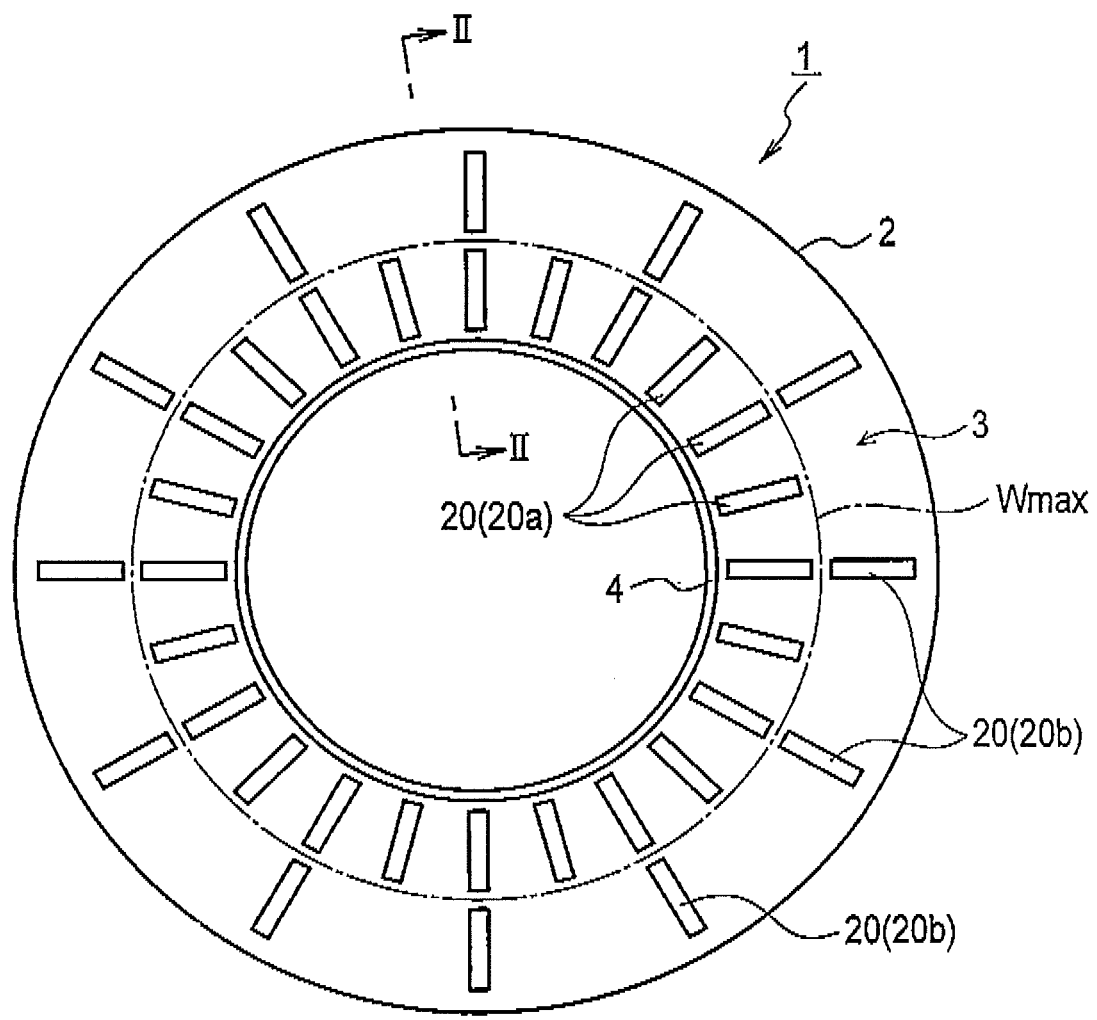
FIG. 1 is a side elevation view illustrating a run-flat tire according to a first embodiment.

A pneumatic tire according to Embodiment 1 will be described in detail below by referring to the drawings.

Figure 2:
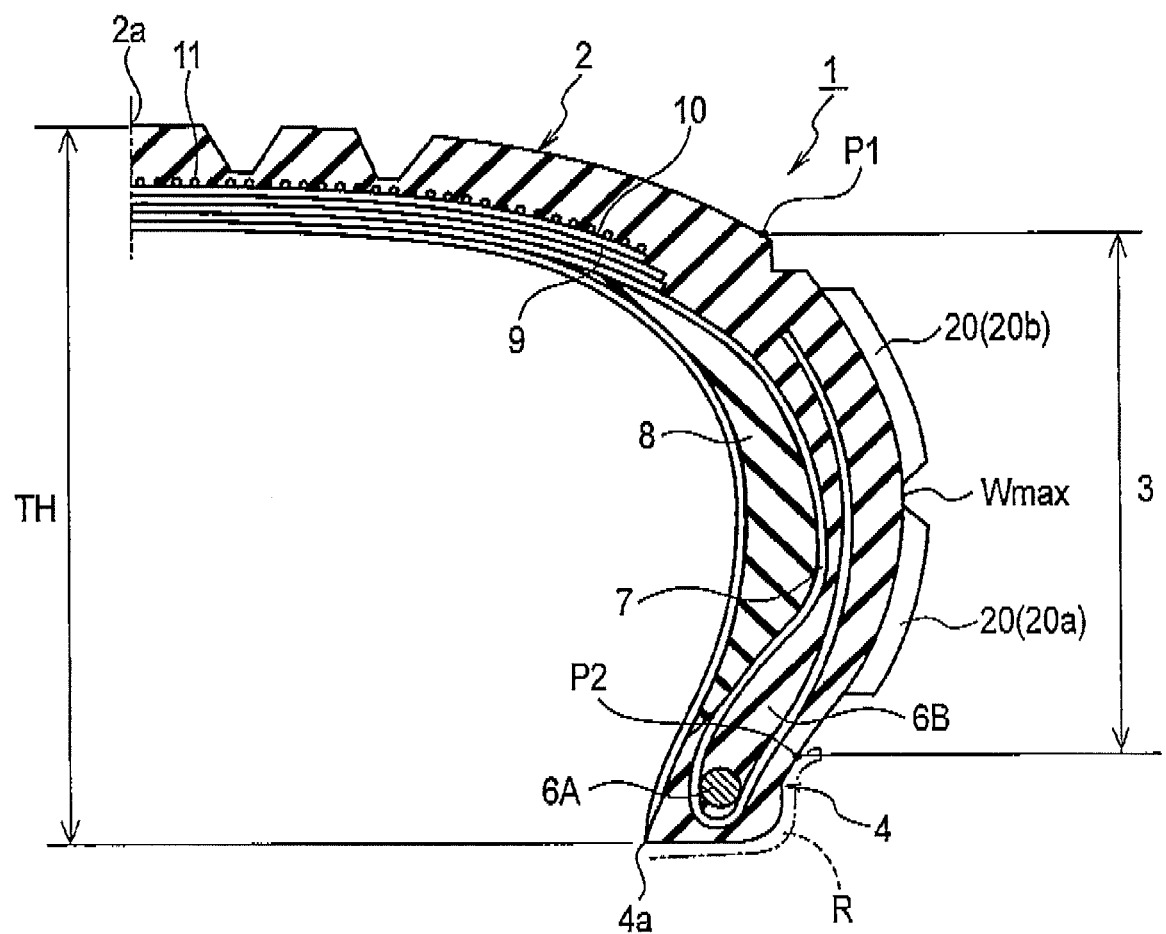
FIG. 2 is a sectional view illustrating a principal portion taken along the line II-II of FIG. 1.
Figure 3:
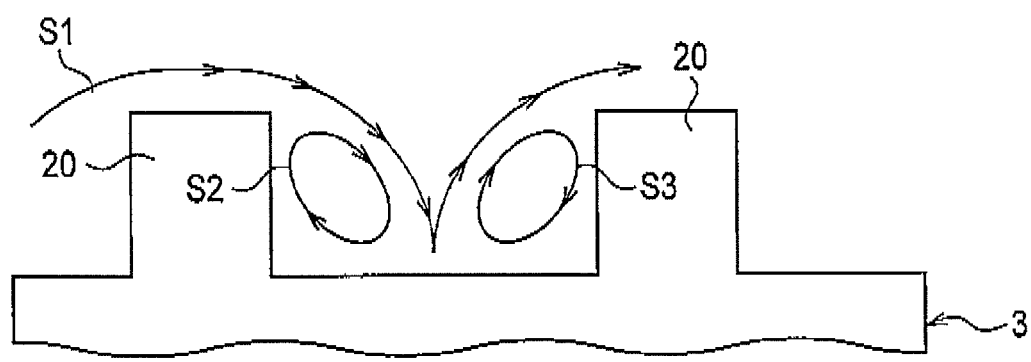
FIG. 3 is a sectional view of turbulence generation ridges according to the first embodiment taken along the tire-circumferential direction.
Figure 4:
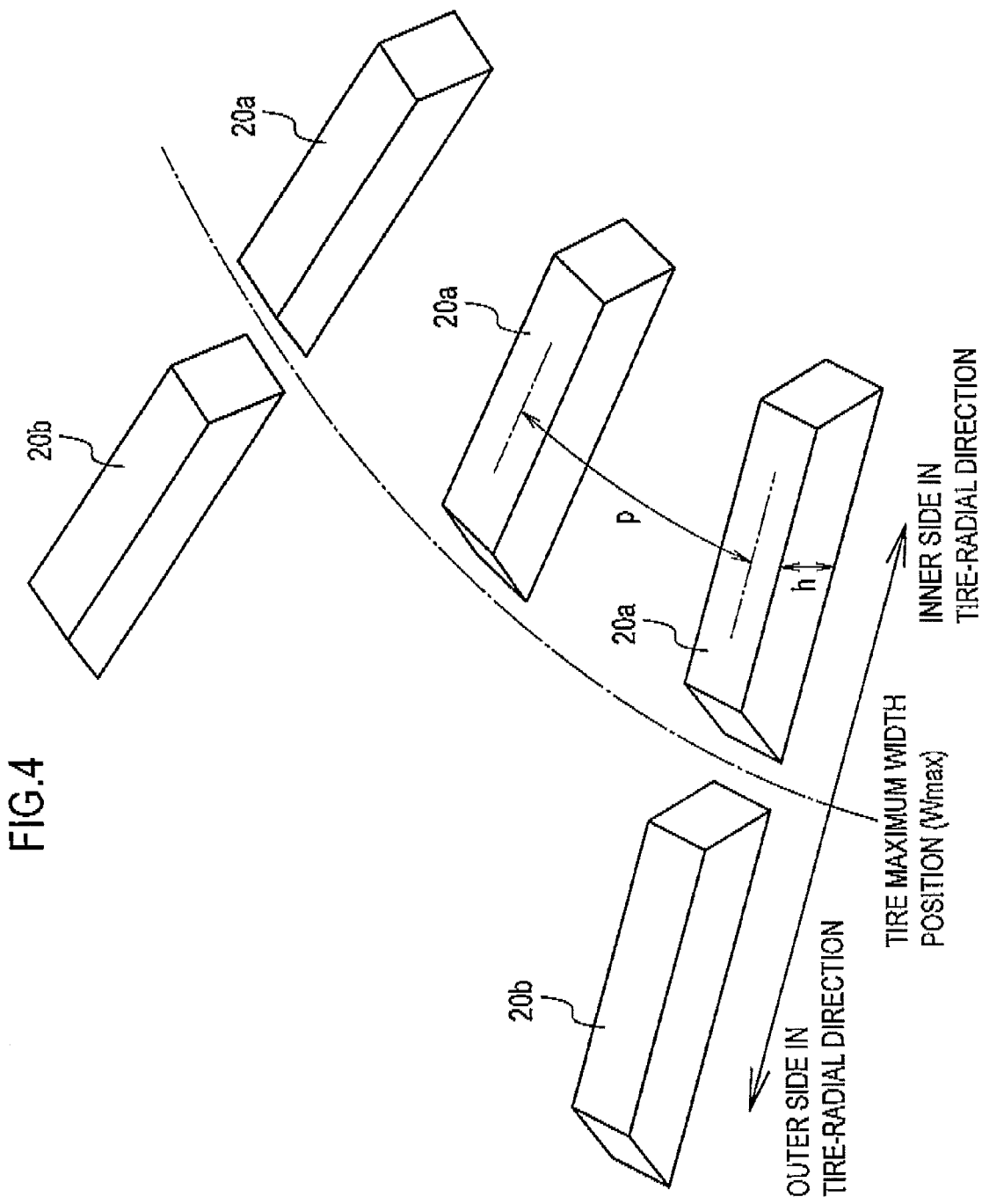
FIG. 4 is a perspective view illustrating a principal portion showing an example arrangement of turbulence generation ridges positioned at the inner side, in the tire-radial direction, of the tire maximum width position and turbulence generation ridges positioned at the outer side, in the tire-radial direction, of the tire maximum width position.

FIGS. 1 to 4 illustrate a run-flat tire 1, which is an example pneumatic tire according to Embodiment 1, and principal portions of the run-flat tire 1. FIG. 1 is a side elevation view illustrating the run-flat tire 1. FIG. 2 is a sectional view illustrating a principal portion taken along the line II-II of FIG. 1. FIG. 3 is a sectional view of turbulence generation ridges taken along the tire-circumferential direction. FIG. 4 is a perspective view illustrating a principal portion showing an example arrangement of turbulence generation ridges positioned at the inner side, in the tire-radial direction, of the tire maximum width position and turbulence generation ridges positioned at the outer side, in the tire-radial direction, of the tire maximum width position.

<Schematic Configuration of Run-Flat Tire>

As FIGS. 1 and 2 show, the run-flat tire 1 roughly includes a tread portion 2, tire side portions 3, and bead portions 4. The tread portion 2 comes in contact with the road surface. The tire side portions 3 form the both sides of the tire. Each of the bead portions 4 is formed along an opening edge of the corresponding tire side portion 3.

Each of the tire side portions 3 lies in a range between a position P1 and a contact outer end P2. Specifically, a tire height TH is defined as a distance, under the proper internal pressure condition, between a tread outermost position 2$a$ and a bead inner end 4$a$ that is a point of the bead portion 4 positioned at the innermost side in the tire-radial direction. Here, the position P1 is defined as a position away from the bead inner end 4$a$ by 90% of the tire height TH. The contact outer end P2 is defined as the outermost point, in the tire-radial direction, of all the points where the bead section 4 and a rim R are in contact with each other.

As FIG. 1 shows, plural turbulence generation ridges 20 are formed on the outer-side surface of each tire side portion 3. Each of the turbulence generation ridges 20 extends in the tire-radial direction, and the plural turbulence generation ridges 20 are arranged along the tire-circumferential direction at a certain pitch. Here, each of the turbulence generation ridges 20 is a lengthy projection configured to generate turbulence over the outer-side surface of the corresponding tire side portion 3 or accelerate turbulence over the outer-side surface of the corresponding tire side portion 3 while the run-flat tire 1 is rotating.

As FIG. 2 shows, each of the bead portions 4 includes a bead core 6A and a bead filler 6B which are provided around the edge of the opening portion of the corresponding tire side portion 3. Specifically, the bead core 6A is made of a steel cord or the like.

In addition, as FIG. 2 shows, the run-flat tire 1 includes carcass plies 7, which serve as a framework for the tire. A sidewall-reinforcement layer 8 is provided as a reinforcing rubber on the inner side (on the inner side in the tire-width direction) of a portion of each carcass ply 7, the portion located in the tire side portion 3. The sidewall-reinforcement layer 8 is made of a rubber stock in a crescent-like shape in a section taken along the tire-width direction.

Plural belt plies (specifically, steel-belt reinforcement layer 9 and 10, and a circumferential-direction reinforcement layer 11) are formed on the outer side, in the tire-radial direction, of the carcass plies 7. The tread portion 2, which is in contact with the road surface, is formed on the outer side, in the tire-radial direction, of the circumferential-direction reinforcement layer 11.

<Configuration of Turbulence Generation Ridge>

In the run-flat tire 1 including the tire side portions 3 each provided with the sidewall-reinforcement layer 8 made of a crescent-shaped reinforcement rubber as in Embodiment 1, lowering the temperature particularly of the tire side portions 3 is effective in terms of improvement in durability.

Accordingly, the run-flat tire 1 of Embodiment 1 is provided with the plural turbulence generation ridges 20 on the outer-side surfaces of the tire side portions 3 as described above so as to generate the turbulence or accelerate the turbulence. Thus, the cooling effect in the tire side portions 3 is enhanced.

As FIG. 1 shows, the plural turbulence generation ridges 20 are arranged, radially around the tire rotation axis, on the outer-side surface of each tire side portion 3. Each of the turbulence generation ridges 20 has its longitudinal side extending in the tire-radial direction. The turbulence generation ridges 20 are disposed in a way that every two turbulence generation ridges 20 that are adjacent to each other in the tire-circumferential direction are separated from each other at a pitch. As FIG. 3 shows, each of the turbulence generation ridges 20 is formed so as to have a rectangular cross section taken along the tire-circumferential direction.

Now, the mechanism of turbulence generation will be described by referring to FIG. 3. Along with the rolling of the run-flat tire 1, a flow S1 of the air that has been in contact with a portion of the tire side portion 3 where no turbulence generation ridge 20 is formed is separated from the tire side portion 3 by one of the turbulence generation ridges 20. The air flow S1 then goes over and beyond the turbulence generation ridge 20. At this time, part of the air flow is retained in a portion (region) S2 located at the backside-surface side of the turbulence generation ridge 20.

Then, the air flow S1 is attached again to the base portion, but this time, to the one located between the turbulence generation ridge 20 and the next one of the turbulence generation ridges 20. The air flow S1 is then separated again by the next turbulence generation ridge 20. At this time, part of the air flow is retained in a portion (region) S3 located between the air flow S1 and the next turbulence generation ridge 20.

Here, a larger velocity gradient (speed) on the regions with which the turbulence S1 comes in contact seems advantageous for improving cooling effect. Accordingly, the turbulence generation ridges 20 are formed on the outer-side surfaces of the tire side portions 3 so as to generate the air flow S1 of a fast flow speed as well as the retention portions S2 and S3. Thus, the generation of turbulence is accelerated over the outer-side surfaces of the tire side portions 3, resulting in improvement in cooling effect for the tire side portions 3.

As has been described thus far, the turbulence generation ridges 20 are configured to generate or accelerate turbulence over the outer-side surfaces of the tire side portions 3 while the run-flat tire 1 is rotating. The turbulence generation ridges 20 thus contribute to higher cooling effect for the tire side portions 4. Particularly in Embodiment 1, as FIGS. 1, 2, and 4 show, the turbulence generation ridges 20 are classified into two groups: the turbulence generation ridges positioned at the inner side, in the tire-radial direction, of the tire maximum width position Wmax (hereafter, referred to as inner-side ridges 20a); and the turbulence generation ridges positioned at the outer side, in the tire-radial direction, of the tire maximum width position Wmax (hereafter, referred to as outer-side ridges 20b). Here, there are more inner-side ridges 20b formed than the outer-side ridges 20b.

Such arrangement is based on the following knowledge. By the influence of centrifugal force generated while the run-flat tire 1 is rotating, an air flow directed from the inner side in the tire-radial direction to the outer side is generated. Accordingly, the turbulence generation ridges 20 formed on the inner side in the tire-radial direction also contribute to the heat dissipation on the outer side in the tire-radial direction. For this reason, arranging the turbulence generation ridges 20 more densely on the inner side in the tire-radial direction can enhance more efficiently the cooling effect for the entire surface areas of the tire side portions 3. In addition, less turbulence generation ridges 20 formed on the outer side in the tire-radial direction are expected to bring the effect to reduce the travelling resistance.

In view of the function of the turbulence generation ridges 20, the sidewall surfaces are the main contributor, the sidewalls raised from the tire side portions 3. Accordingly, the sum of all the sidewall areas is used here as a way to express how numerous the turbulence generation ridges 20 are. Specifically, the sidewall areas are the projected areas of the sidewalls of the turbulence generation ridges 20 seen in the tire-radial direction. Now, in the run-flat tire 1 in Embodiment 1, Si denotes the sum of the sidewall areas of all the inner-side ridges 20a, which are positioned at the inner side, in the tire-radial direction, of the tire maximum width position Wmax, while So denotes the sum of the sidewall areas of all the outer-side ridges 20b, which are positioned at the outer side, in the tire-radial direction, of the tire maximum width position Wmax. The values of Si and So must satisfy the relationship Si>So. Specifically, for example, the sum So of the sidewall areas of all the outer-side ridges 20b is within a range from 30% to 80% of the sum Si of the sidewall areas of all the inner-side ridges 20a.

As a specific method to make the sum Si of the sidewall areas of all the inner-side ridges 20a larger than the sum So of the sidewall areas of all the outer-side ridges 20b, it is conceivable, for example, to provide more inner-side ridges 20a than the outer-side ridges 20b. In this case, on the outer-side surfaces of the tire side portions 3, fewer outer-side ridges 20b are provided, the outer-side ridges 20b arranged at the outer side, in the tire-radial direction, of the tire maximum width position Wmax. Accordingly, the space with no outer-side ridges 20b can be used effectively to provide textual information and designs, such as letters and marks, that are necessary for the tire.

In addition, in the run-flat tire of Embodiment 1, of all the turbulence generation ridges 20 formed on the outer-side surfaces of the tire side portions 3, the inner-side ridges 20a, in particular, are arranged equidistantly along the tire-circumferential direction. As has been described above, the inner-side ridges 20a play a significant role to lower the temperature of the outer-side surfaces of the tire side portions 3. Therefore, in Embodiment 1, the inner-side ridges 20a, in particular, are designed to be arranged regularly at an adequate pitch. Thus, turbulence is generated or turbulence is accelerated throughout the entire areas, in the tire-circumferential direction, of the outer-side surfaces of the tire-side portions 3. In this way, the temperature of the tire side portions 3 can be lowered down efficiently.

Here, the outer-side ridges 20b may not have to be arranged regularly at an equal pitch, because air flowing outwards in the tire-radial direction by the influence of the above-described centrifugal force can bring about sufficient effect of lowering the temperature. Nevertheless, arranging the outer-side ridges 20b equidistantly along the tire-circumferential direction also contributes to the lowering of the temperature in a uniform manner throughout the entire areas along the tire-circumferential direction without causing unevenness.

For the purpose of lowering effectively the temperatures of the outer-side surfaces of the tire side portions 3, it is particularly important here to determine adequately the pitch and the heights of the inner-side ridges 20a, which are arranged equidistantly along the tire-circumferential direction.

Suppose that every two inner-side ridges 20a that are adjacent to each other in the tire-circumferential direction has an excessive narrow pitch in between relative to the height of each inner-side ridge 20a. In this case, the turbulence generated by the effect caused by the inner-side ridges 20a fails to hit (be re-attached) properly the surfaces of the tire side portions 3, resulting in smaller effect to lower the temperature of the surfaces of the tire side portions 3. Conversely, suppose a case where every two inner-side ridges 20a that are adjacent to each other in the tire-circumferential direction has an excessively wide pitch in between relative to the height of each inner-side ridge 20a. In this case, the turbulence generated by the effect caused by the inner-side ridges 20a fails to cool some regions, resulting in insufficient effect to lower the temperature of the surfaces of the tire side portions 3.

Taking the above points into consideration, in Embodiment 1, in order to obtain sufficient effect to lower the temperature of the outer-side surfaces of the tire side portions 3, the following relationship is to be satisfied between the height of each inner-side ridge 20a and the pitch at which the inner-side ridges 20a are arranged equidistantly in the tire-circumferential direction.

In FIG. 4, h denotes the maximum height of each inner-side ridge 20a from the surface of the corresponding tire side portion 3, and p denotes the pitch between the two adjacent inner-side ridges 20a measured at points each having the maximum height h within each of the two adjacent inner-side ridges 20a. The above-mentioned relationship to be satisfied is $1.0 \leq p/h \leq 50.0$.

The relationship is obtained through the following examinations to find the proper pitch and the height for the inner-side ridges 20a. Firstly, a value of p/h that is smaller than 1.0 makes the pitch between every two adjacent inner-side ridges 20a too narrow, which in turn drops drastically the effect to lower the temperature of the surfaces of the tire side portions 3. In contrast, a value of p/h that is larger than 50.0 makes the pitch between every two adjacent inner-side ridges 20a too wide, which in turn drops drastically the effect to lower the temperature of the surfaces of the tire side portions 3. For this reason, in order to obtain sufficient effect to lower the temperature of the surfaces of the tire side portions 3, the values of p and h are set so as to satisfy the relationship $1.0 \leq p/h \leq 50.0$.

Incidentally, as described above, the run-flat tire 1 of Embodiment 1 has more inner-side ridges 20a than the outer-side ridges 20b. Here, if areas within the outer side, in the tire-radial direction, of each outer-side surface of the corresponding tire side section 3 is excessively wide without any outer-side ridges 20b formed therein, no effect to lower the temperatures may be obtained at all in the area.

The following findings were obtained from the examination of the relationship between the temperature-lowering effect and the arrangement of the outer-side ridges 20b within the areas located on the outer side in the tire-radial direction. Specifically, no temperature-lowering effect can be obtained for an area with no outer-side ridges 20b formed therein if the area exceeds a quarter of the circumference, that is, if the area has a center angle larger than 90° around the tire rolling axis.

Accordingly, in Embodiment 1, the outer-side ridges 20b are arranged in accordance with the following rule. Of all the areas located on the outer-side, in the tire-radial direction, of the outer-side surfaces of the tire side portions 3, even the largest one of the areas with no outer-side ridges 20b formed therein must be smaller than an area that has a center angle of 90° smaller than around the tire rolling axis. Accordingly, even for the areas located on the outer-side in the tire-radial direction, desired temperature-lowering effect can be obtained while the increase in the travelling resistance caused by the formation of the outer-side ridges 20b can be kept to a minimum.

Incidentally, as described above, each of the turbulence generation ridges 20 (i.e., the inner-side ridges 20a and the outer-side ridges 20b) of the run-flat tire 1 of Embodiment 1 has a rectangular cross section taken along the tire-circumferential direction. If each turbulence generation ridge 20 is formed as a rectangular block that has an identical sectional shapes from one end to the other in the tire-radial direction, manufacturing bare is more likely to take place when the run-flat tire 1 is molded, highly likely resulting in defects in shape or appearances.

Accordingly, each of the turbulence generation ridges 20 (i.e., the inner-side ridges 20a and the outer-side ridges 20b) is preferably formed in a way that the height of each end portion in the tire-radial direction gradually decreases, as shown in FIG. 4. By forming the turbulence generation ridges 20 in this way, manufacturing bare at the time of molding can be made less likely, less likely resulting in defects in shape or appearances.

In addition, in the run-flat tire 1 of Embodiment 1, the maximum height of each of the turbulence generation ridges 20 (i.e., the inner-side ridges 20a and the outer-side ridges 20b) from the surface of the corresponding tire side portion preferably ranges from 1 mm to 5 mm.

Suppose that the run-flat tire 1 of Embodiment 1 is used particularly for the passenger vehicles. In this case, each of the turbulence generation ridges 20 (i.e., the inner-side ridges 20a and the outer-side ridges 20b) having a maximum height lower than 1 mm results in smaller effect to generate or accelerate the turbulence. In contrast, each turbulence generation ridge 20 having a maximum height higher than 5 mm results in higher flexibility and lower stiffness of the turbulence generation ridges 20. Consequently, the effect to generate or accelerate the turbulence is decreased while the travelling resistance is increased.

If the maximum height of each turbulence generation ridge 20 is within a range from 1 mm to 5 mm, the turbulence generation ridge 20 can be applied to a run-flat tire to be used for passenger vehicles. Then, the temperature of the tire side portions 3 can be lowered effectively by generating turbulence while the travelling resistance can be reduced.

MODIFIED EXAMPLES

In the run-flat tire 1 of Embodiment 1, the turbulence generation ridges 20 formed on the outer surfaces of the tire side portions 3 are classified into two groups: the inner-side ridges 20a positioned at the inner side, in the tire-radial direction, of the tire maximum width position Wmax; and the outer-side ridges 20b positioned at the outer side, in the tire-radial direction, of the tire maximum width position Wmax. In addition, there are more inner-side ridges 20a formed than the outer-side ridges 20b. A Variety of alternative, specific arrangement patterns for the inner-side ridges 20a and the outer-side ridges 20b are possible other than the example pattern shown in FIGS. 1 and 4.

Figure 5:
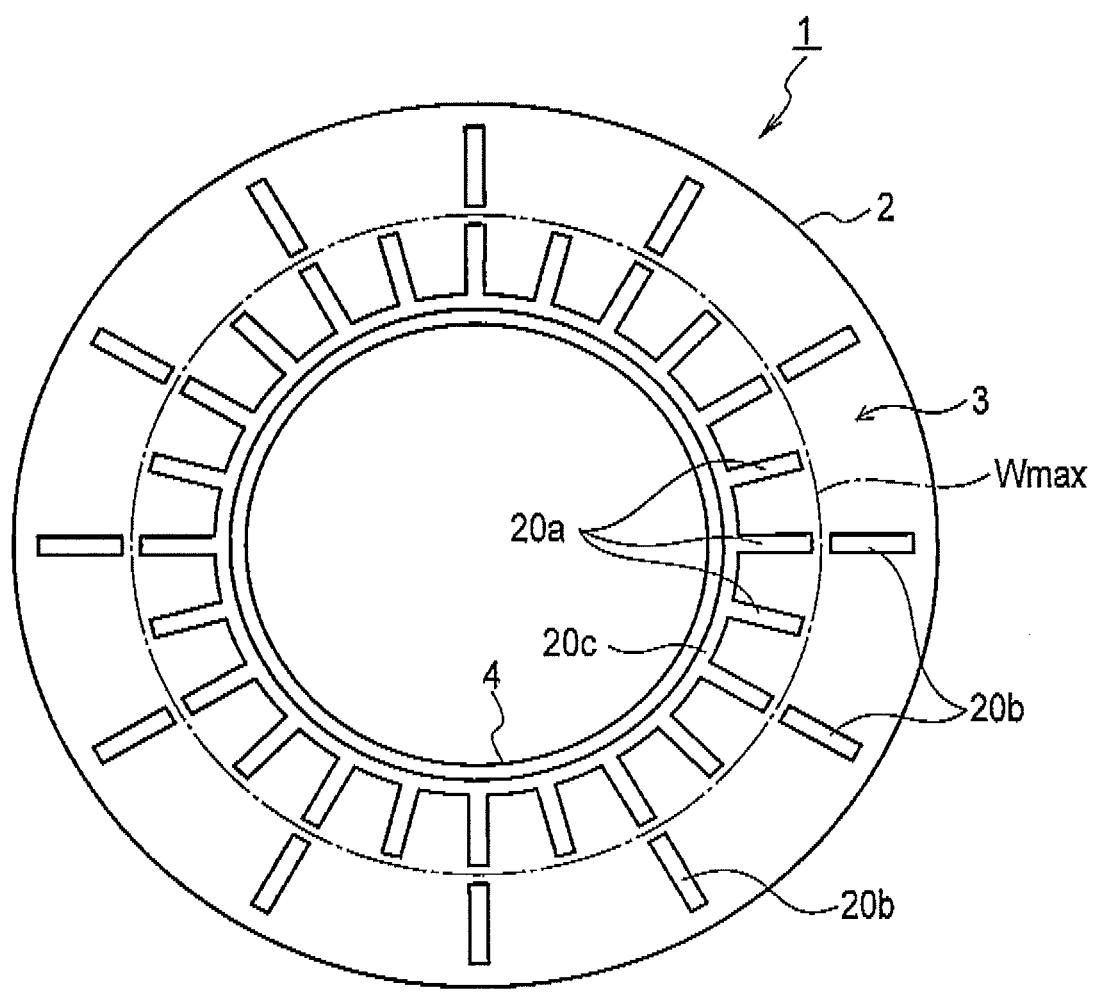
FIG. 5 is a diagram showing another example of the arrangement pattern for the inner-side ridges and the outer-side ridges, and is a side elevation view illustrating the run-flat tire with the turbulence generation ridges formed in accordance with the above-mentioned arrangement pattern.
Figure 6:
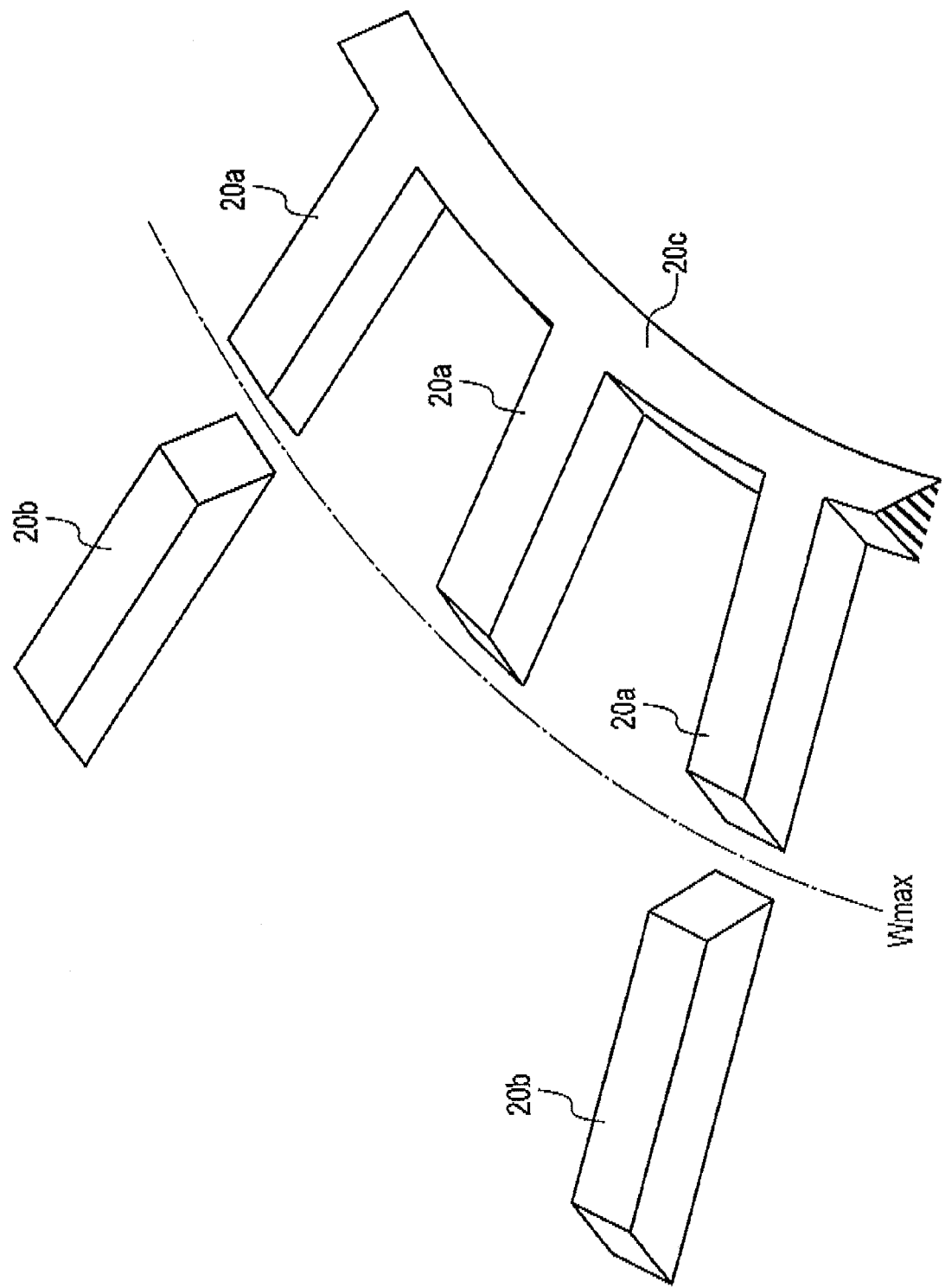
FIG. 6 is a perspective view illustrating a principal portion of a run-flat tire with turbulence generation ridges formed in accordance with the pattern shown in FIG. 5.

One of such alternative patterns is shown in FIGS. 5 and 6. In the pattern, a ring-shaped connection portion 20c is formed on the outer-side surface of each tire side portion 3 so as to be adjacent to the corresponding bead portion 4. The plural inner ridges 20a arranged radially around the tire rolling axis are connected to one another by the ring-shaped connection portion 20c at the end portions located on the inner side, in the tire-radial direction, of the inner-side ridges 20a. The plural inner-side ridges 20a thus connected together form an integrated body.

Figure 7:
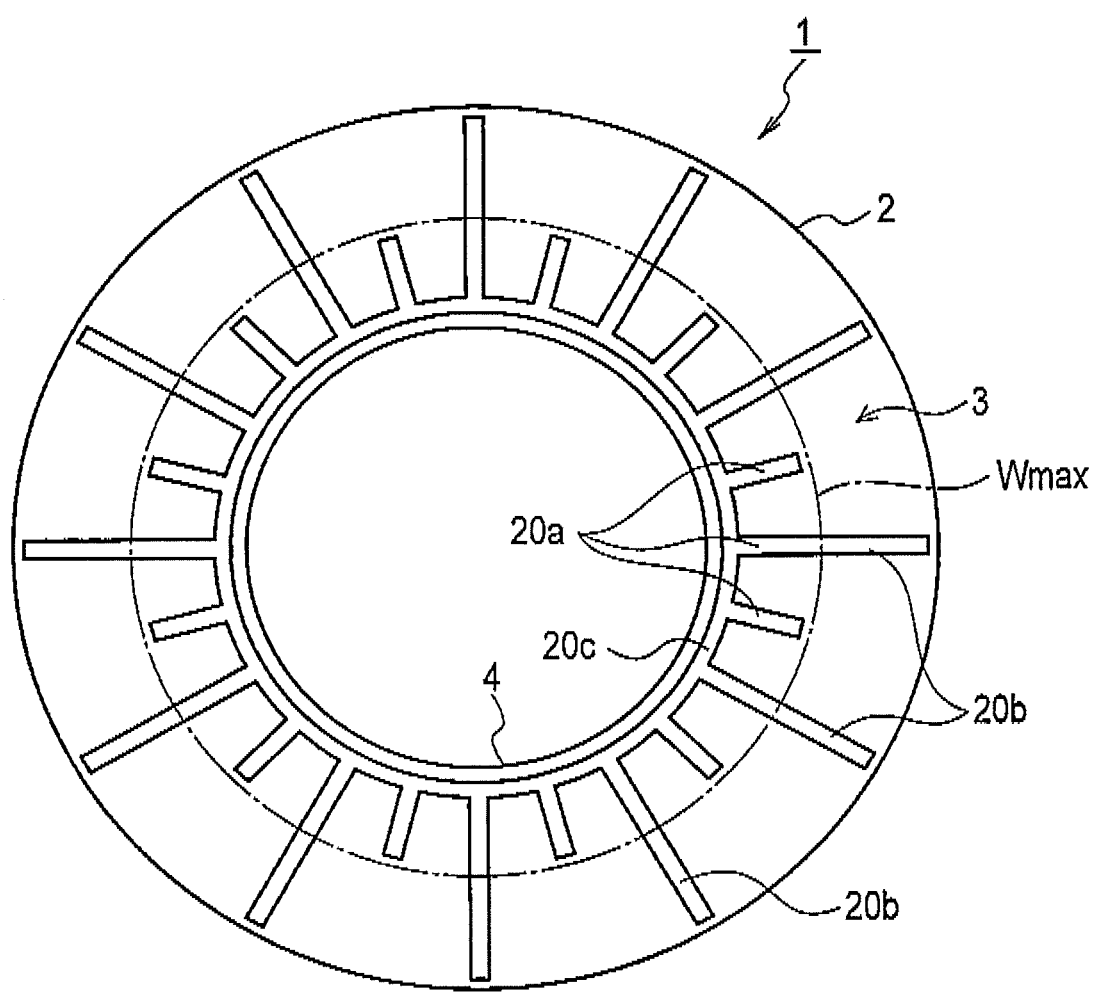
FIG. 7 is a diagram showing still another example of the arrangement pattern for the inner-side ridges and the outer-side ridges, and is a side elevation view illustrating the run-flat tire with the turbulence generation ridges formed in accordance with the above-mentioned arrangement pattern.
Figure 8:
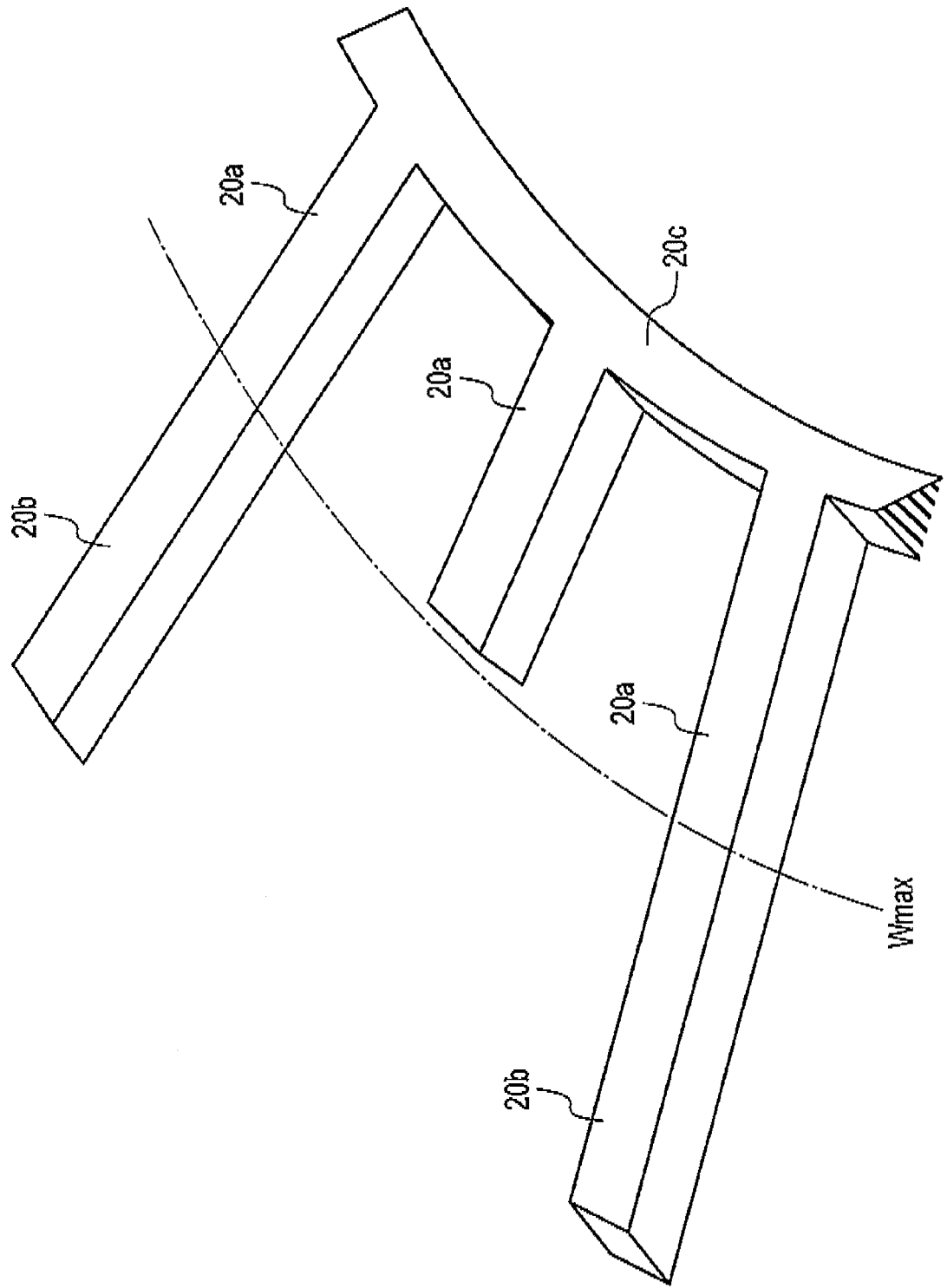
FIG. 8 is a perspective view illustrating a principal portion of a run-flat tire with turbulence generation ridges formed in accordance with the pattern shown in FIG. 7.

Another alternative pattern is shown in FIGS. 7 and 8. In this pattern, the plural inner ridges 20a are connected together by the ring-shaped connection portion 20c at the end positions located on the inner side, in the tire-radial direction, of the inner-side ridges 20a so as to form an integrated body. Besides, each of the outer-side ridges 20b is connected to the end portion located on the outer side, in the tire-radial direction, of the corresponding inner-side ridge 20a. Thus formed is an integrated body including all the inner-side ridges 20a and all the outer-side ridges 20b.

Figure 9:
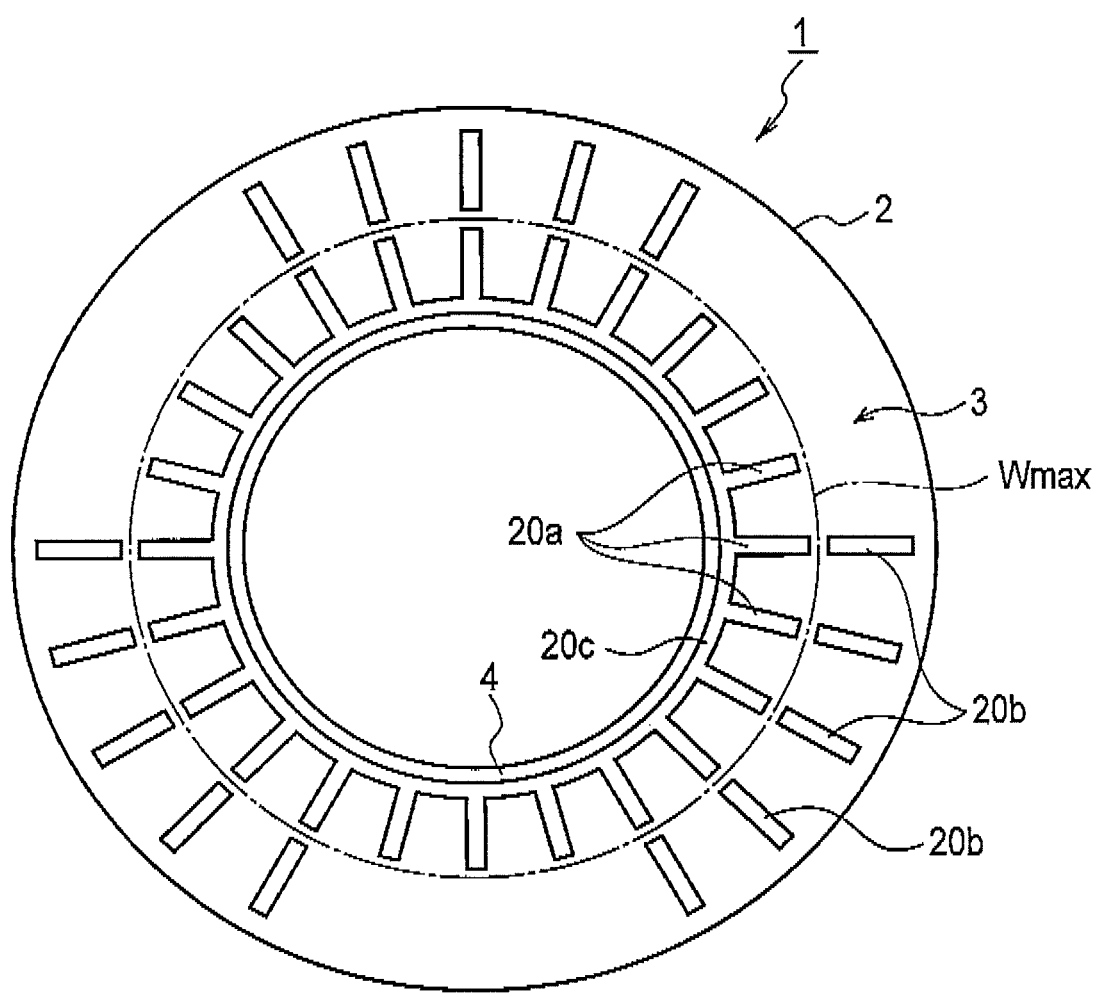
FIG. 9 is a diagram showing even still another example of the arrangement pattern for the inner-side ridges and the outer-side ridges, and is a side elevation view illustrating the run-flat tire with the turbulence generation ridges formed in accordance with the above-mentioned arrangement pattern.
Figure 10:
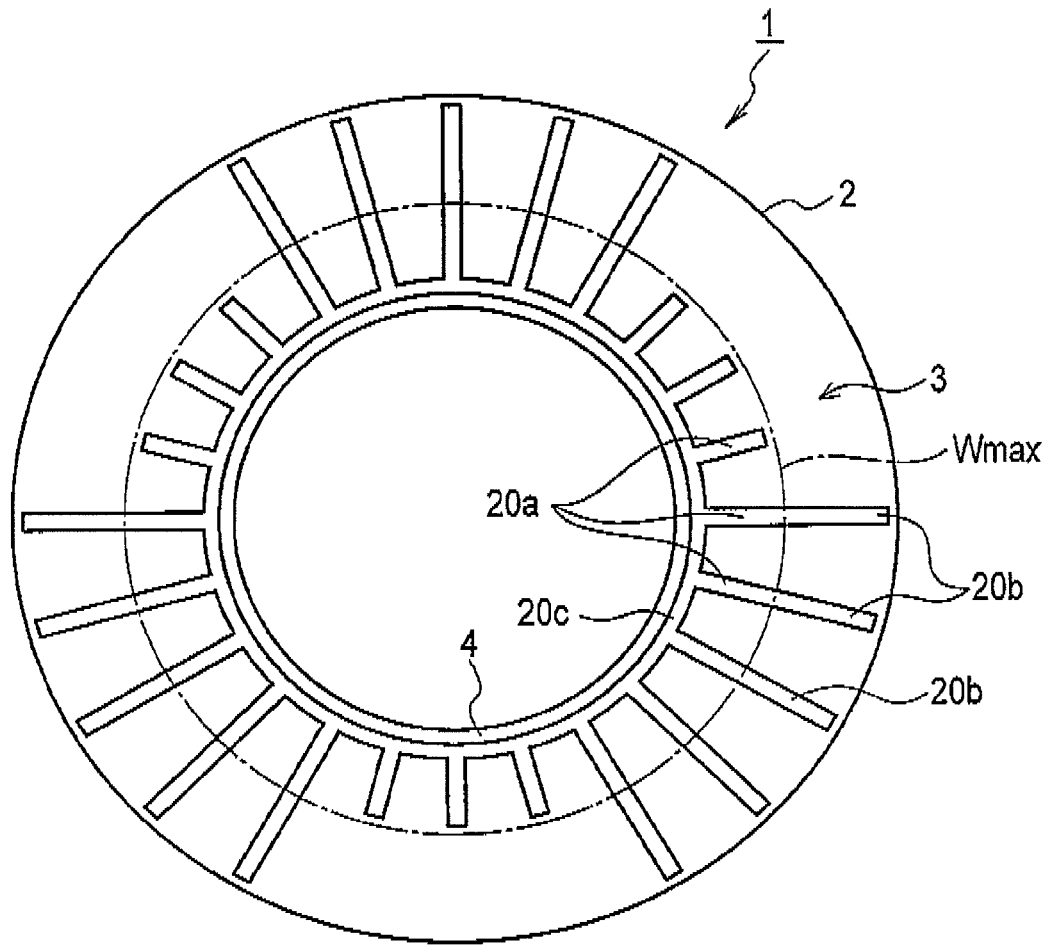
FIG. 10 is a diagram showing even further still another example of the arrangement pattern for the inner-side ridges and the outer-side ridges, and is a side elevation view illustrating the run-flat tire with the turbulence generation ridges formed in accordance with the above-mentioned arrangement pattern.

Still another alternative pattern is shown in FIGS. 9 and 10. In this pattern, the outer-side ridges 20b are arranged not equidistantly along the tire-circumferential direction but discretely. In this case of the pattern with discrete arrangement of the outer-side ridges 20b, it is preferable, as described above, that even the largest one of the ranges in which no outer-side ridge 20b is formed should have a central angle around the tire rolling axis smaller than 90°.

<Advantageous Effects>

For the purpose of finding effective arrangement of the turbulence generation ridges 20 as means for lowering tire temperature, detailed analysis was conducted on the air flow while the tire was rolling. The analysis revealed the following facts. Firstly, the air flowed along the tire-circumferential direction but in the opposite direction to the tire-rolling direction. In addition, by the influence of the centrifugal force generated by the rolling of the tire, another air flow was observed from the inner side in the tire-radial direction (from the edge of the opening that was in contact with the rim) outwards in the tire-radial direction (towards the tread portion 2).

On the basis of the result of the air-flow analysis done in the above described manner, an examination was conducted to find adequate arrangement, in the tire-radial direction, of the turbulence generation ridges 20. The examination revealed the following fact. Provided that each turbulence generation ridge 20 has a given, equal sidewall area (the sidewall area refers to the area of the sidewall of each turbulence generation ridge 20 raised from the surface of the corresponding tire side portion 3, and here, refers to the projected area obtained when the sidewall is seen in particular in the tire-circumferential direction), arranging the turbulence generation ridges 20 more densely on the inner side in the tire-radial direction than on the outer side in the tire-radial direction was more effective in terms of lowering the temperature of the tire side portions 3 than otherwise. This is because of the following reasons.

Specifically, by arranging the turbulence generation ridges 20 on the inner side in the tire-radial direction, the turbulence is accelerated in the upstream side of the air flow while the tire is rolling, thereby generating cooling effect. The cooling effect lowers the temperature of the inner side, in the tire-radial direction of the surfaces of the tire side portions 3. Air is cooled when passing over the lower-temperature surfaces of the tire side portions 3, and then is caused by the influence of the centrifugal force to pass over the outer-side in the tire-radial direction. As a result, the cooled air lowers the temperature of the outer-side, in the tire-radial direction, of the surfaces of the tire side portions 3.

In contrast, suppose a case where the turbulence generation ridges 20 are arranged only on the outer side, in the tire-radial direction, of the surfaces of the tire side portions 3. In this case, no turbulence-acceleration effect can be obtained for the inner side in the tire-radial direction, so that the temperature of this side is not lowered at all. It turns out that this arrangement only had cooling effect for the outer side in the tire-radial direction.

In other words, it turns out that if the turbulence generation ridges 20 having identical sidewall areas are to be arranged, arranging the turbulence generation ridges 20 more densely on the inner side in the tire-radial direction is more effective for the purpose of lowering the temperature than otherwise arranging the same number of the turbulence generation ridges 20.

Incidentally, it is known that the travelling resistance depends on the flow speed. So, it turns out that arranging the turbulence generation ridges 20 on the outer side in the tire-radial direction where the air flows faster (since the flow speed is obtained by multiplying the radius by the angular speed, the flow on the outer side in the tire-radial direction is faster) increases the travelling resistance.

The results of examination revealed the following facts. If the surface of each tire side portion 3 is subdivided into two areas, using the tire maximum width position Wmax as a reference, of the inner-side in the tire-radial direction, and the outer side in the tire-radial direction, more turbulence generation ridges 20 are preferably arranged on the inner side in the tire-radial direction. In the outer-side area in the tire-radial direction, where the air flows faster, even a smaller number of turbulence generation ridges 20 can generate enough turbulence to achieve the effect to lower the temperature of the tire side portions 3.

More turbulence generation ridges 20 are arranged in the inner-side area in the tire-radial direction, where the air flows slowly. In contrast fewer turbulence generation ridges 20 are arranged in the outer-side area in the tire-radial direction, where the air flows faster, than the turbulence generation ridges 20 that are arranged in the inner-side area in the tire-radial direction. Accordingly, higher effect to lower the temperature of the entire tire side portions 3 can be obtained.

There are various methods of expressing how numerous the turbulence generation ridges 20 are. Among them, the use of the sum of the sidewall areas of the turbulence generation ridges 20 (the projected areas, seen in the tire-circumferential direction, of the sidewalls of the turbulence generation ridges 20 that are raised from the surfaces of the tire side portions 3) is effective in view of the turbulence generation mechanism and of the travelling resistance generation mechanism. The use of the sum of the sidewall areas helps to keep effect to lower the temperature of the tire side portions 3 to a high level while the tire weight and the travelling resistance can be prevented from increasing.

In addition, the relationship Si>So is satisfied by forming more turbulence generation ridges 20 in the inner-side area in the tire-radial direction than the turbulence generation ridges 20 formed in the outer-side area in the tire-radial direction.

So, fewer turbulence generation ridges 20 are arranged in the outer-side area in the tire-radial direction. Accordingly, the space with no turbulence generation ridges 20 formed therein can be used to provide textual information and designs, such as letters and marks, that are necessary for the tire.

In addition, the turbulence generation ridges 20 that are arranged at the inner side, in the tire-radial direction, of the tire maximum width position Wmax play a significantly important role to lower the temperature of the surfaces of the tire side portions 3. Accordingly, the turbulence generation ridges 20 are arranged regularly at a proper pitch, so that the turbulence can be generated or the turbulence can be accelerated throughout the areas in the circumferential direction. Thus, the temperature of the surfaces of the tire side portions can be lowered efficiently.

In addition, it is important to arrange, at an adequate pitch, the turbulence generation ridges 20 of adequate heights that are arranged at the inner side, in the tire-radial direction, of the tire maximum width position Wmax. Accordingly, when h denotes the maximum height of each turbulence generation ridge 20, and p denotes the pitch between the two adjacent turbulence generation ridges 20 measured at points each having the maximum height h within each of the two adjacent turbulence generation ridges 20, the values of h and p should have the relationship such that the value of p/h is within a range from 2 to 24. Consequently, still higher effect to lower the temperature of the surfaces of the tire side portions can be obtained.

In addition, even the largest area with no turbulence generation ridges 20 formed therein must be an area that has a center angle of 90° or smaller around the tire rolling axis. Accordingly, desired effect to lower the temperature can be obtained for the outer side in the tire-radial direction as well. Consequently, in the outer-side area in the tire-radial direction, desired temperature-lowering effect can be obtained while the increase in the travelling resistance caused by the turbulence generation ridges 20 can be made as small as possible.

In addition, at least one of an end portion, on the inner side in the tire-radial direction, of each turbulence generation ridge 20 and an end portion of on the outer side in the tire-radial direction, of the turbulence generation ridge 20 is formed so that the height of the end portion gradually decrease towards the at least one of the end portions. Accordingly, when the turbulence generation ridges 20 are molded, the occurrence of manufacturing bare can be made less likely, less likely resulting in defects in shape and appearances.

In addition, the maximum height of each turbulence generation ridge 20 is within a range from 1 mm to 5 mm. So, the turbulence generation ridge 20 can be applied effectively to tires for passenger vehicles. Accordingly, lowering the temperature can be effectively achieved by generating turbulence or accelerating turbulence particularly in the case of tires for passenger vehicles. In addition, the travelling resistance can be reduced in this case.

In addition, a run-flat tire equipped with a crescent-shaped reinforcement rubber in each of the tire side portions needs to lower the temperature particularly of the tire side portions. So, applying the turbulence generation ridges 20 to such a run-flat tire can have the effect to lower the temperature of the tire side portions. Accordingly, durability of the run-flat tire can be enhanced by effectively lowering the temperature of the run-flat tire on the tire side portions where reinforcement rubber is located. At the same time, the increase in the tire weight and in the travelling resistance can be suppressed.

Example Case A

For the purpose of confirming the effect of the invention, run-flat tires of Examples 1 to 7 and run-flat tires of Comparative Examples 1 to 3 were fabricated in accordance with the parameters listed in Table 1. The prototypes thus fabricated were subjected to durability drum testing under the following conditions to evaluate the durability and the travelling resistance for each prototype. Table 1 shows the evaluation results.

TABLE 1

| Parameter | Comparative Example 1 no ridges | Comparative Example 2 with ridges | Comparative Example 3 with ridges | Example 1 with ridges | Example 2 with ridges | Example 3 with ridges | Example 4 with ridges | Example 5 with ridges | Example 6 with ridges | Example 7 with ridges |
|---|---|---|---|---|---|---|---|---|---|---|
| Sum of Sidewall Areas of Inner-Side Ridges (Si) | — | 100 | 40 | 100 | 100 | 100 | 100 | 100 | 100 | 100 |
| Sum of Sidewall Areas of Outer-Side Ridges (So) | — | 100 | 100 | 50 | 80 | 90 | 30 | 20 | 50 | 40 |
| So/Si (%) | — | 100 | 250 | 50 | 80 | 90 | 30 | 20 | 50 | 40 |
| Maximum Height h (mm) | — | 2 | 2 | 2 | 2 | 2 | 2 | 2 | 2 | 2 |
| p/h of Inner-Side Ridge | — | 12 | 30 | 12 | 12 | 12 | 12 | 12 | 12 | 12 |
| Proportion of Maximum Area Without Outer-Side Ridge (%) | — | 1.3 | 1.3 | 2.6 | 1.6 | 1.4 | 4.3 | 6.4 | 22 | 28 |
| RFT Drum Durability | 50 | 120 | 78 | 109 | 116 | 117 | 107 | 97 | 106 | 97 |

TABLE 1-continued

| Parameter | Comparative Example 1 no ridges | Comparative Example 2 with ridges | Comparative Example 3 with ridges | Example 1 with ridges | Example 2 with ridges | Example 3 with ridges | Example 4 with ridges | Example 5 with ridges | Example 6 with ridges | Example 7 with ridges |
|---|---|---|---|---|---|---|---|---|---|---|
| Rolling Resistance | 94 | 110 | 108 | 98 | 100 | 106 | 97 | 96 | 97 | 97 |

Comparative Example 1 was a run-flat tire without any turbulence generation ridges 20. Comparative Example 2 was a run-flat tire in which the sum of the sidewall areas of the inner-side ridges 20a is equal to the sum of the sidewall areas of the outer-side ridges 20b. Comparative Example 3 was a run-flat tire in which the sum of the sidewall areas of the outer-side ridges 20b is larger than the sum of the sidewall areas of the inner-side ridges 20a.

Meanwhile, Examples 1 to 7 were run-flat tires in each of which the sum of the sidewall areas of the inner-side ridges 20a was larger than the sum of the sidewall areas of the outer-side ridges 20b. Examples 1 to 7 differed from one another in their respective ratios of the sum of the sidewall areas of the outer-side ridges 20b to the sum of the sidewall areas of the inner-side ridges 20a.

The run-flat tires of Examples 1 to 7 also differed from one another and from the run-flat tires of Comparative Example 2 and 3 in their respective proportions of the maximum area without any outer-side ridges 20b (proportion thereof to the entire area located on the outer side in the tire-radial direction). The 2-mm maximum height h of each of the inner-side ridges 20a and the outer-side ridges 20b was common to Examples 1 to 7 and Comparative Examples 2 and 3. In addition, the ratio of the width p of each inner-side ridge 20a to the maximum height h thereof (p/h) was common to be 12.

Other conditions set for the run-flat tires of Examples 1 to 7 and Comparative Examples 1 to 3 are given below.
Tire size: 285/50R20
Applied Rim: 8JJ×20
(Durability Test) Internal Pressure: 0 kPa
Load: 9.8 kN
Speed: 90 km/h
Durability drum testing was conducted under such conditions, and the durability in terms of the mileage until the occurrence of failure is expressed by indexes.
(Rolling Resistance)
Internal Pressure: 230 kPa
Load: 10.3 kN
Rolling resistance values of the run-flat tires fitted in a drum were checked for under the above-described conditions.

The evaluation result for Comparative Example 1 and the evaluation results for others shown in Table 1 turns out that a run-flat tire with the turbulence generation ridges 20 has a significantly improved durability. This is owing to the fact that the temperatures of the tire side portions 3 can be lowered with the effect of the turbulence generation ridges 20 which accelerate the generation of turbulence and which thus enhance the cooling performance for the tire side portions 3.

In addition, it is clearly found from the comparison between the evaluation results of Comparative Example 3 with the evaluation results of Examples 1 to 7 that by making, among the turbulence generation ridges 20, the sum of the sidewall areas of the inner-side ridges 20a positioned at the inner side of the tire maximum width position larger than the sum of the sidewall areas of the outer-side ridges 20b positioned at the outer side of the tire maximum width positions, the effect to lower the temperatures of the tire side portions 3 is further improved and the durability is further improved.

In addition, it is clearly found from the comparison between the evaluation results of Comparative Example 2 with the evaluation results of Examples 1 to 7 that by providing fewer outer-side ridges 20b in particular among the turbulence generation ridges 20, the travelling resistance can further be reduced and the travelling resistance can be reduced.

In addition, it is found from the comparison of the evaluation results of Examples 1 to 7 with one another that a larger ratio of the sum of the sidewall areas of the outer-side ridges 20b to the sum of the sidewall areas of the inner-side ridges 20a enhances the effect to lower the temperature, resulting in higher durability. In contrast, the rolling resistance tends to be increased slightly.

Accordingly, the ratio of the sum of the sidewall areas of the outer-side ridges 20b to the sum of the sidewall areas of the inner-side ridges 20a preferably has an optimum value in view of a trade-off between the durability and the rolling resistance. In addition, a larger proportion of the maximum area without any outer-side ridges 20b formed therein decreases slightly the effect to lower the temperature, and thus worsens the durability slightly. So, the maximum area without any outer-side ridges 20b formed therein is preferably made as small as possible while considering the trade-off with the rolling resistance which is to be increased by forming more outer-side ridges 20b.

Figure 11:
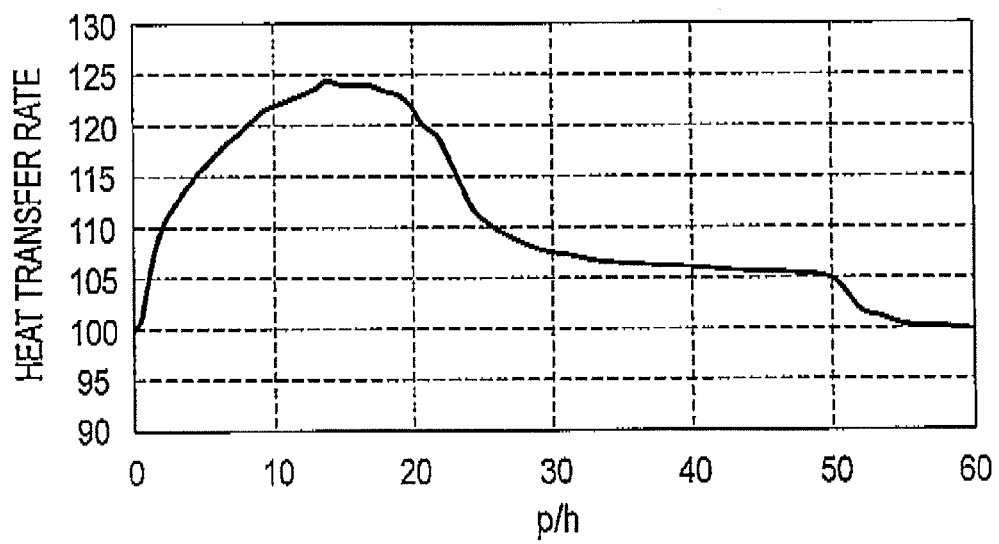
FIG. 11 is a graph illustrating the relationship between the value of p/h and the heat transfer rate.
Figure 12:
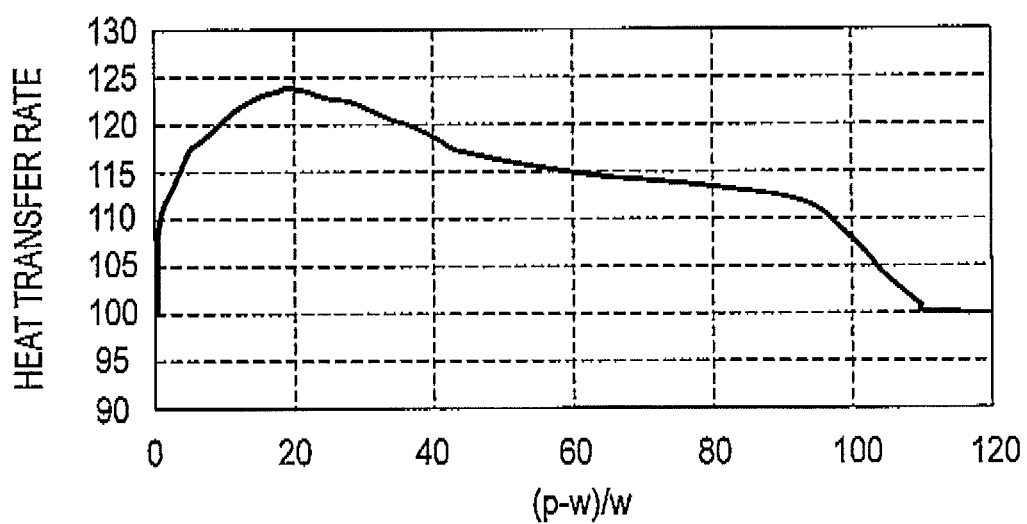
FIG. 12 is a graph illustrating the relationship between the value of (p−w)/w and the heat transfer rate.

Next, FIGS. 11 and 12 show the results of heat-transfer-rate measurement testing. The testing was conducted by use of tires differed from one another in two different kinds of parameters. A first parameter is the ratio p/h, which is the ratio of the pitch p to the maximum height h of each of the inner-side ridges 20a that are arranged equidistantly in the tire-circumferential direction. A second parameter is the ratio (p−w)/w where w is the width of each inner-side ridge 20a and p is the pitch.

In each of the graphs shown in FIGS. 11 and 12, the vertical axis represents the heat-transfer rate, which was obtained in the following way. Firstly, a certain constant voltage was applied to a heater attached to the surface of each tire. The heater thus generated a certain constant amount of heat. Then, while each tire was rolling, the temperature of the tire was measured. A larger heat-transfer rate means higher cooling effect. In FIGS. 11 and 12, the value 100 represents the heat-transfer rate for the run-flat tire without any turbulence generation ridges 20

The heat-transfer-rate measurement testing was conducted under the following conditions.
Tire size: 285/50R20
Applied Rim: 8JJ×20
Internal Pressure: 0 kPa
Load: 0.5 kN
Speed: 90 km/h
The results shown in FIG. 11 reveal that the tires of p/h ranging from 1.0 to 50.0 had higher heat-transfer rates. So, setting p/h within this range can improve the durability.

In addition, the results shown in FIG. 12 reveal that the tires of (p−w)/w ranging from 1.0 to 100.0 had higher heat-transfer rates. So, setting (p−w)/w within this range can improve the durability.

[Embodiment 2]

Next, a pneumatic tire according to Embodiment 2 will be described in detail by referring to the drawings. The schematic configuration of a run-flat tire 1 of Embodiment 2 is identical to that of Embodiment 1, so the description thereof will not be given.

Figure 13:
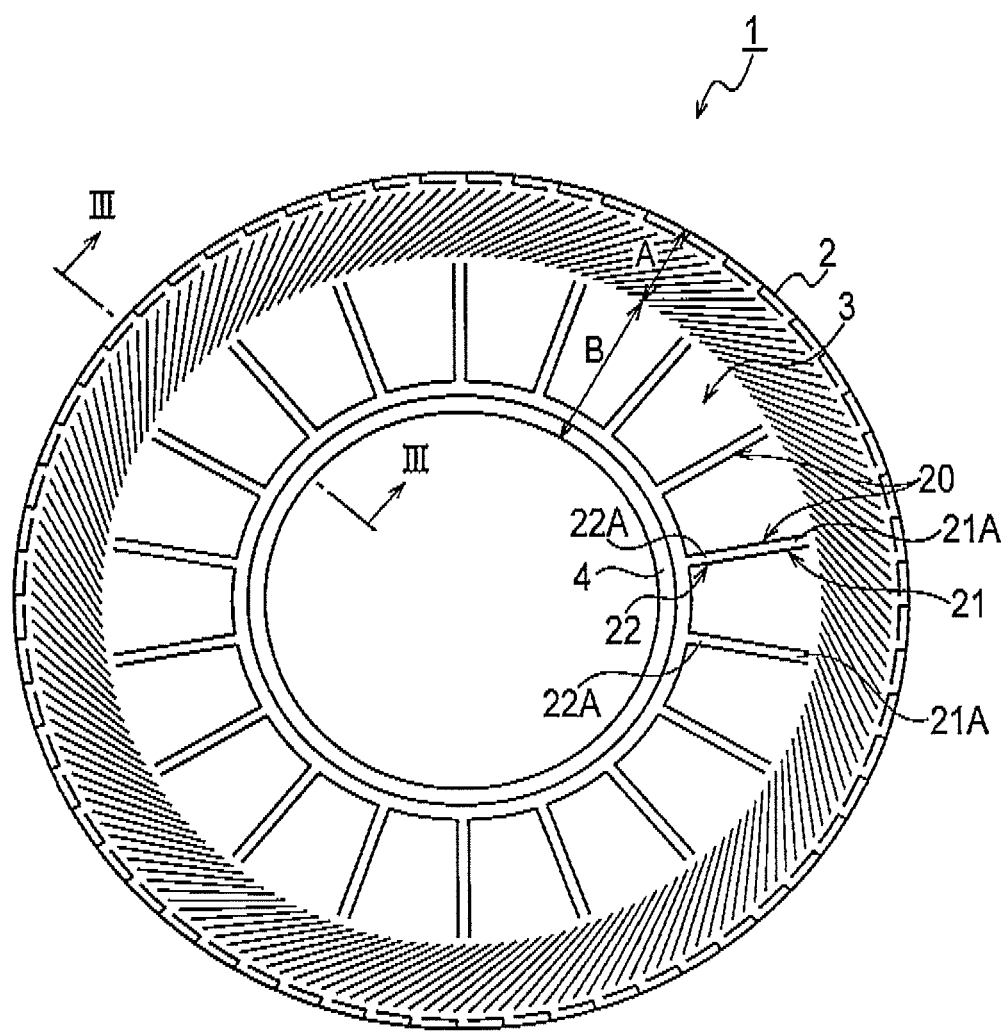
FIG. 13 is a side elevation view illustrating a run-flat tire according to a second embodiment.
Figure 14:
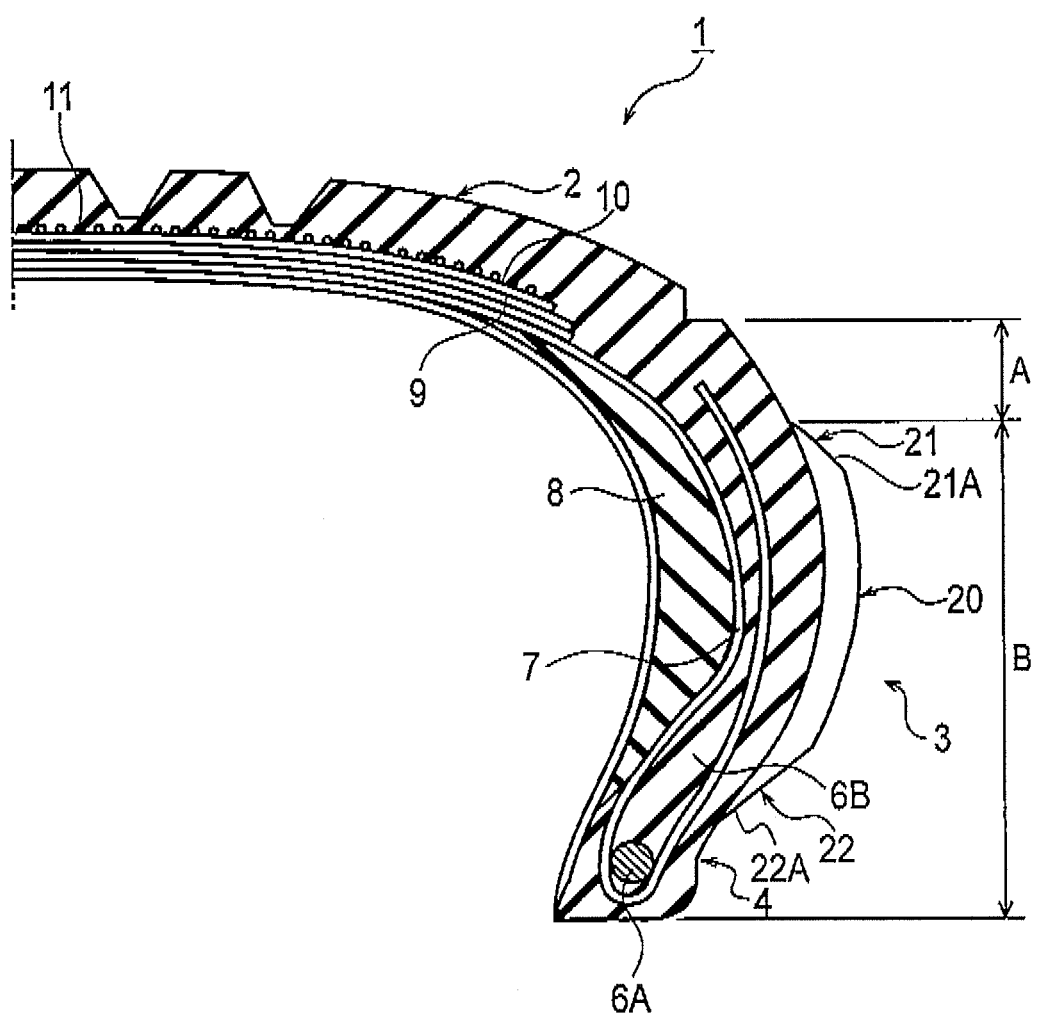
FIG. 14 is a sectional view illustrating a principal portion taken along the line III-III of FIG. 13.
Figure 15A:
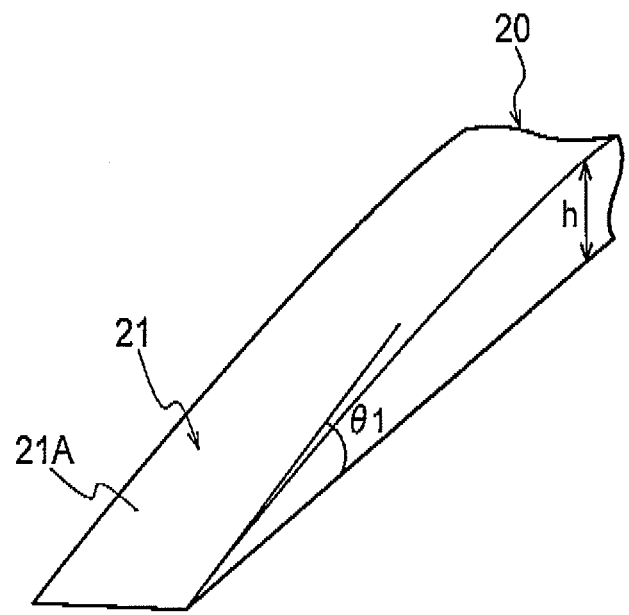
FIG. 15($a$) is a perspective view illustrating a principal portion showing an outer-side end portion of a turbulence generation ridge of the run-flat tire according to an embodiment of the invention.
Figure 15B:
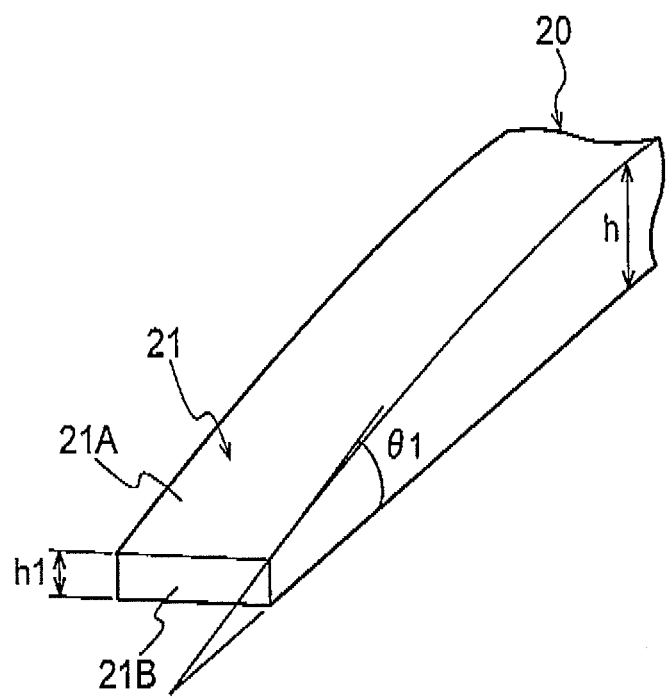
Figure 16:
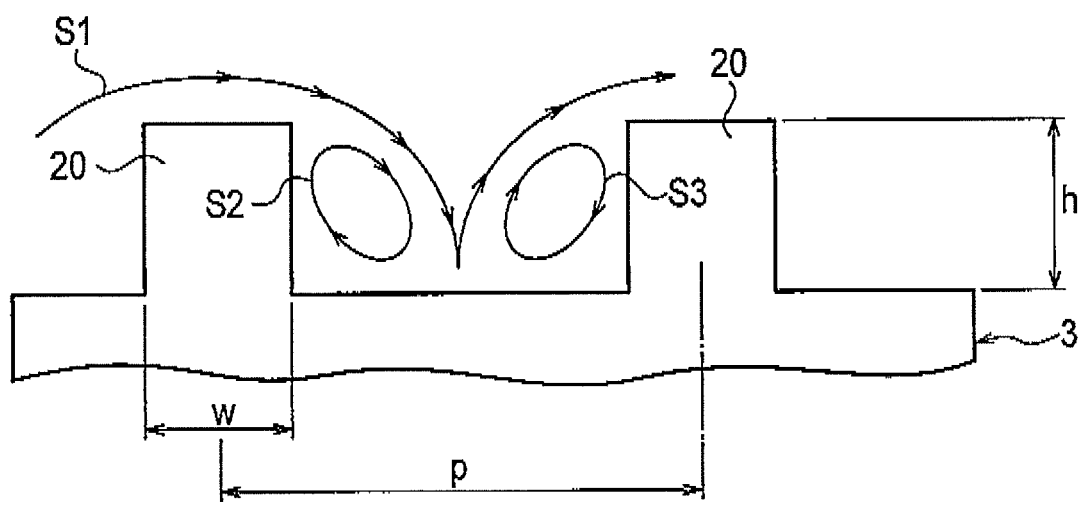
FIG. 16 is a sectional diagram of turbulence generation ridges taken along the tire-circumferential direction and describing turbulence generation mechanism.

FIGS. 13 to 16 illustrate the run-flat tire 1, which is an example pneumatic tire according to Embodiment 2, and some portions of the run-flat tire 1. FIG. 13 is a side elevation view illustrating the run-flat tire 1. FIG. 14 is a sectional view illustrating a principal portion taken along the line III-III of FIG. 13. FIG. 15(a) is a perspective view illustrating a principal portion showing an outer-side end portion, in the tire-radial direction, of a turbulence generation ridge. FIG. 15(b) is a perspective view illustrating a principal portion showing Modified Example 1 of the outer-side end portion, in the tire-radial direction, of the turbulence generation ridge. FIG. 16 is a diagram describing turbulence generation mechanism by the turbulence generation ridges.

<Configuration of Turbulence Generation Ridge>

In the run-flat tire 1 including tire side portions 3 each provided with a sidewall-reinforcement layer 8 made of a crescent-shaped reinforcement rubber as in Embodiment 2, lowering the temperature of the tire side portions 3 is effective in terms of improvement in durability.

As FIGS. 13 and 14 show, each turbulence generation ridge 20 is formed in the corresponding tire side portion 3, and extends in the tire-radial direction so as to have a lengthy and narrow shape. As FIG. 16 shows, each turbulence generation ridge 20 has a rectangular cross section taken along the tire-circumferential direction.

As FIGS. 13 and 14 show, the turbulence generation ridges 20 are formed so that an outer-side end portion 21, in the tire-radial direction, of each turbulence generation ridge 20 can be located within a region B (hereafter, will be referred to as non-contact region B) located at the inner side, in the tire-radial direction, of the innermost position, in the tire-radial direction, of a region A. The region A is formed as the outer-side region, in the tire-radial direction, of the tire side section 3, and is the place where ridges and letters (not illustrated) are formed.

As FIGS. 14 and 15(a) show, the outer-side end portion 21 has a top surface 21A (a surface that can be seen from the tire side surface) that is formed as a sloping surface slanting with respect to the surface of the tire side portion 3. The top surface 21A is formed contiguously to the surface of the tire side portion 3 so that the edge of the end of the top surface 21a can be on the same plane as the surface of the tire side portion 3 is.

As FIG. 15(a) shows, the maximum angle θ1 formed by the tangent to the top surface 21A (sloping surface) and the surface of the tire side portion 3 is within a range from 10° to 40°. A maximum angle θ1 that is smaller than 10° is equivalent to a shorter length of each turbulence generation ridge 20 measured in the tire-radial direction. Accordingly, no large effect to improve cooling performance can be expected. Conversely, if a maximum angle θ1 that is larger than 40°, the outer-side end portion 21A of each turbulence generation ridge 20 may be chipped or may drop off when the green tire is cured in the mold during the tire manufacturing processes.

An inner-side end portion 22, in the tire-radial direction, of each turbulence generation ridge 20 is formed so as to be smoothly contiguous to and on the same plane as the surface of each tire side portion 3 is, the tire side portion 3 raised from the bead portion 4. The maximum angle formed by the tangent to a top surface 22A of the inner-side end portion 22 and the surface of the tire side portion 3 is also within a range from 10° to 40°.

As FIG. 16 shows, in Embodiment 2, every two adjacent turbulence generation ridges 20 are formed with a predetermined pitch p in between, and all the turbulence generation ridges 20 have the same heights h and widths w. The pitch p refers to a distance measured at the center, in the direction in which each adjacent turbulence generation ridges 20 extends, of each of the adjacent turbulence generation ridges 20, the distance measured at point on the bisector of the width, in the tire-circumferential direction, of each turbulence generation ridge 20. The height h refers to a height of a portion located at the center, in the direction in which each turbulence generation ridge 20 extends. The width w refers to the width of the portion located at the center in the direction in which each turbulence generation ridge 20 extends.

The turbulence generation ridges 20 are formed so that the height h, the pitch p, and the width w can satisfy the following two relationships: $1.0 \leq p/h \leq 50.0$; and $1.0 \leq (p-w)/w \leq 100.0$. It is preferable that the value of the ratio of the pitch p of the turbulence generation ridges 20 to the height h (p/w) should be within the following range: $2.0 \leq p/h \leq 24.0$. It is more preferable that the ratio (p/h) should be within the following range: $10.0 \leq p/h \leq 20.0$. The height h is within the following range: $1 \leq h \leq 5$ mm. The width w is within the following range: $0.5 \leq h \leq 5$ mm.

The air flow (turbulence) depends on the above-mentioned ratio p/h. If the pitch p is too short, that is, if the pitch is narrowed, the air flow does not enter the portion located between two adjacent turbulence generation ridges 20. In contrast, if the pitch p is too wide, the result will be the same as in a case where no such shapes as the turbulence generation ridges 20 are formed. Accordingly, it is preferable to set the ratio p/h within the above-mentioned ranges.

The ratio (p−w)/w means the ratio between the pitch p and the width w of the protruding portion. Too small a ratio (p−w)/w is equivalent to equalizing the proportion of the surface areas of the turbulence generation ridges to the area of the surface that is the target for the improved cooling. The turbulence generation ridges 20 are made of rubber, so no great effect to improve cooling can be expected by increasing the surface areas. Accordingly, the minimum value of the ratio (p−w)/w is set at 1.0. The ratio (p−w)/w is within the following range: $1.0 \leq (p-w)/w \leq 100.0$.

In the run-flat tire 1, the tire side portion 3 is more likely to degrade while running in a punctured state (while running with a tire having 0-kPa internal pressure) than the other parts do. In Embodiment 2, the run-flat tire 1 is provided with the turbulence generation ridges 20 so that the turbulence generation ridges 20 generate the turbulence of the air, which can be enhance the cooling of the tire side portions 3.

This is because of the following reason. The rubber that tires are made of is a material of poor heat conductivity. So, rather than by expanding the heat-dissipating area to enhance the cooling, larger cooling effect can be obtained by enhancing the turbulence generation and making the turbulence hit directly on the tire side portions. Note that the outer-side end portions 21 of the turbulence generation ridges 20 located within the non-contact region B do not come into contact with the road surface at all. Accordingly, the turbulence generation ridges 20 are not destroyed. Consequently, cooling effect can be maintained.

Next, the mechanism of turbulence generation will be described by referring to FIG. 16. Along with the rolling of the run-flat tire 1, a flow S1 of the air that has been in contact with a portion of the tire side portion 3 where no turbulence generation ridge 20 is formed is separated from the tire side portion 3 by one of the turbulence generation ridges 20. The air flow S1 then goes over and beyond the turbulence generation ridge 20. At this time, part of the air flow is retained in a portion (region) S2 located at the backside-surface side of the turbulence generation ridge 20.

Then, the air flow S1 is attached again to the base portion but this time, to the one located between the turbulence generation ridge 20 and the next one of the turbulence generation ridges 20. The air flow S1 is then separated again by the next turbulence generation ridge 20. At this time, part of the air flow is retained in a portion (region) S3 located between the air flow S1 and the next turbulence generation ridge 20. Here, a larger velocity gradient (speed) on the regions with which the turbulence S1 comes in contact seems advantageous for improving cooling effect rate.

Modified Example 1

FIG. 15(b) is a perspective view illustrating a principal portion showing Modified Example 1 of the outer-side end portion 21 of the turbulence generation ridge 20 formed on the run-flat tire 1 of Embodiment 2. As FIG. 15(b) shows, the outer-side end portion 21, in the tire-radial direction, of each turbulence generation ridge 20 has a height that is gradually decreasing as in the case of the outer-side end portion 21 shown in FIG. 15(a). The top surface 21A, however, is not on the same place as the surface of the corresponding tire side portion 3 is. Instead, the outer-side end portion 21 shown in FIG. 15(b) has an end face 21B having a low height h1. The maximum angle θ1 made by the tangent to the top surface 21A and the surface of the tire side portion is equal to or lower than 40° as in the case of Embodiment 2.

In this Modified Example 1, the low height h1 of the end face 21B allows the air to escape inwards in the tire-radial direction when the tire is formed by molding, thereby the turbulence generation ridges can be prevented from being chipped or dropped off.

Modified Example 2

Figure 17:
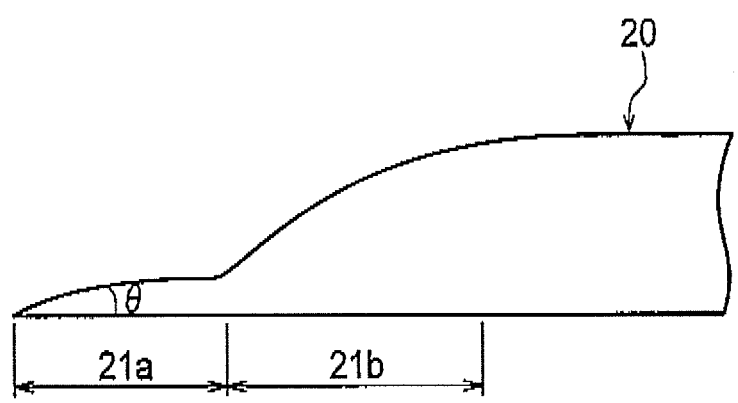
FIG. 17 is a side elevation view showing Modified Example 2 of the turbulence generation ridge.

FIG. 17 is a perspective view illustrating a principal portion showing the outer-side end portion 21 of each turbulence generation ridge 20 of Modified Example 2. In Modified Example 2, the outer-side end portion 21 includes a gently sloping portion 21a and a steeply sloping portion 21b, which are formed in this order from the edge. The angle θ formed by the tangent to the top surface of the gently sloping portion 21a (the tangent extending substantially in the tire-radial direction) and the surface of the corresponding tire side portion 3 is within a range from 10° to 40°.

When the tire is formed by molding, the gently sloping portion 21a prevents the turbulence generation ridges 20 from being chipped or dropped off. In addition, since including the steeply sloping portion 21b, each turbulence generation ridge 20 can secure a certain height in the vicinity of the end portion. Accordingly, the cooling effect caused by the turbulence generation can be obtained also in the vicinities of the outer-side end portions of the turbulence generation ridges 20.

Modification Example 3

Figure 18:
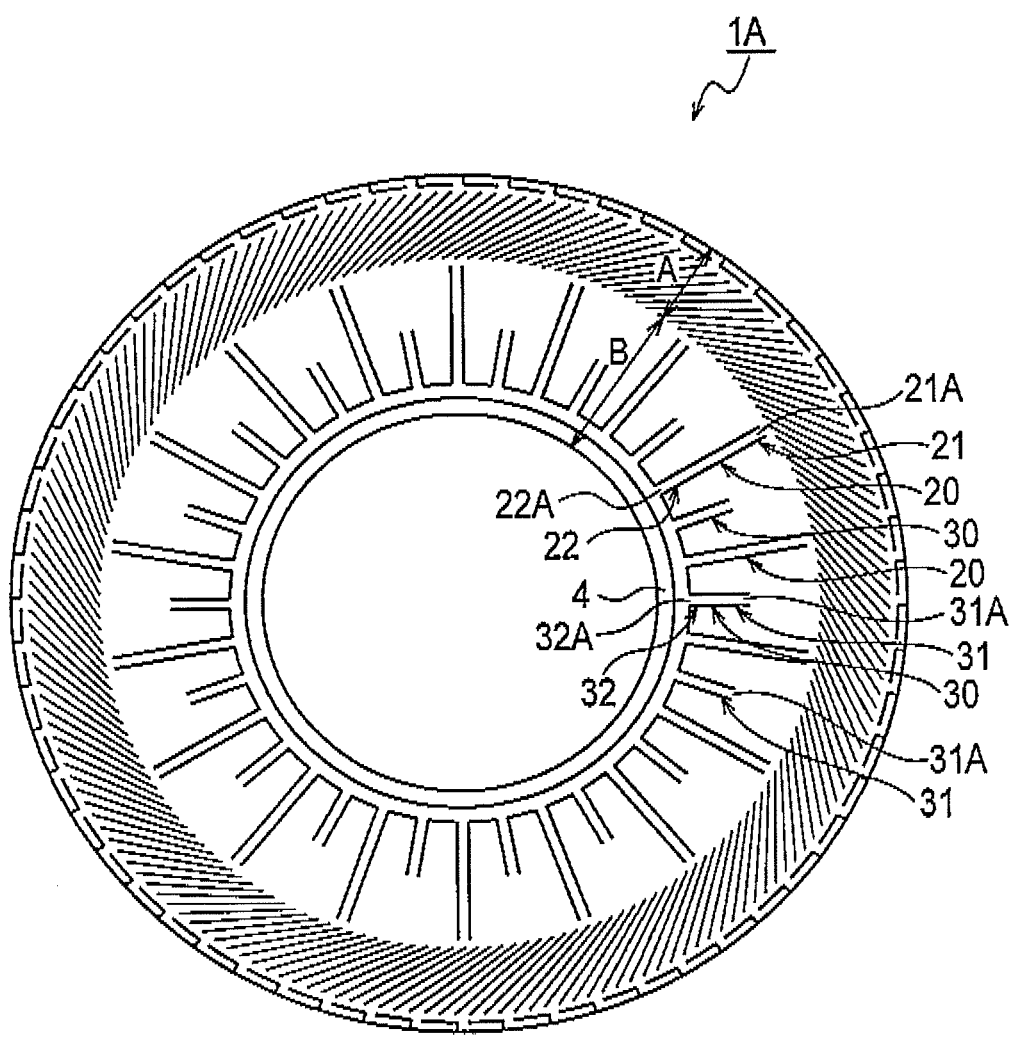
FIG. 18 is a side elevation view illustrating a run-flat tire with turbulence generation ridges of Modification Example 3.

FIG. 18 is a side elevation view illustrating a run-flat tire 1A showing turbulence generation ridges 20 of Modification Example 3. As FIG. 18 shows, the run-flat tire 1A of Modification Example 3 is characterized in that longer turbulence generation ridges 20 and shorter turbulence generation ridges 30 are alternately arranged in the tire-circumferential direction.

Each of the longer turbulence generation ridges 20 has the same configuration as the configuration described above. Each of the shorter turbulence generation ridges 30 has an inner-side end portion 32 that is similar to the inner-side end portion 22 of the turbulence generation ridge 20. Specifically, the inner-side end portion 32 is formed so as to be smoothly contiguous to and be on the same plane as the surface of the corresponding tire side portion 3 is, the tire side portion 3 raised from the bead portion 4. The maximum angle formed by the tangent to a top surface 32A of the inner-side end portion 32 and the surface of the corresponding tire side portion 3 is also within a range from 10° to 40°.

In the run-flat tire 1A of Modification Example 3, the longer turbulence generation ridges 20 and the shorter turbulence generation ridges 30 are alternately arranged in the tire-circumferential direction. Accordingly, more complex turbulence can be generated, and thus an improvement in the cooling effect can be expected.

In addition, each of the shorter turbulence generation ridges 30, which has approximately half a length of each longer turbulence generation ridge 20, has an outer-side end portion 31 that is sloping with the height h gradually decreasing towards the very end. The outer-side end portion 31 is formed contiguously to the surface of the corresponding tire side portion 3. Specifically, at the very end, a top surface 31A of the outer-side end portion 31 is on the same plane as the surface of the corresponding tire side portion 3 is. The maximum angle formed by the tangent to the top surface 31A and the surface of the corresponding tire side portion 3 is also within a range from 10° to 40°.

<Advantageous Effects>

Generally, if a run-flat tire is fabricated with turbulence generation ridges 20 having a shape of a narrow and lengthy box protruding in the tire side portions 3, the following inconveniences occur. Specifically, since each of the end portions, in the longitudinal direction, of each turbulence generation ridge 20 has a sheer, angular shape, rubber cannot sufficiently flow into corners because of air staying in the corners that has failed to escape when a green tire is cured in a mold (dies). As a consequence, bare defects occur frequently in some cases.

Bare defects occur in such angular end portions for the following two reasons. Firstly, the outer-side end portion of each turbulence generation ridge 20 is at a high position in the normal direction from the plane. Secondly, the sheer end face makes the rubber flow directed towards the end portion.

A method usually taken the purpose of preventing bare defects from occurring is forming vent holes in the mold so as to allow the air escape therethrough. However, each of the turbulence generation ridges 20 having a width of approximately 1 mm has a difficulty in allowing the formation of vent holes in the mold.

To address this, in Embodiment 2, each of the turbulence generation ridge 20 is formed in a way that the height of the outer-side end portion located on the outer side in the tire-radial direction is gradually decreasing so as to be directed towards the surface of the corresponding tire side portion 3. Therefore, the additional advantageous effects can be obtained in Embodiment 2 besides the advantageous effects obtainable according to Embodiment 1. Accordingly, when a green tire is cured in the mold, the turbulence generation ridges 20 are chipped or dropped off less frequently, and bare is less likely to occur. Consequently, pneumatic tires of favorable quality, achieving cooling effect owing to the turbulence generation ridges 20, can be manufactured.

In addition, in each of the turbulence generation ridges 20, the height of the outer-side end portion 21 located on the outer side in the tire-radial direction is gradually decreasing so as to direct towards the surface of the corresponding tire side portions 3 until the outer-side end portion 21 is on the same place as the surface of the corresponding tire side portion 3 is. Accordingly, when a green tire is cured in the mold during the manufacturing process, the air in the mold can escape more easily to the outer side in the tire-radial direction. Consequently, the turbulence generation ridges 20 are chipped or dropped off less frequently, and bare is less likely to occur.

In addition, the angle formed by the tangent to a top surface 21A of the outer-side end portion 21 and the surface of the corresponding tire side portion 3 is within a range from 10° to 40°. Accordingly, at the time of curing, the turbulence generation ridges 20 are chipped or dropped off less frequently, and bare is less likely to occur. Besides, cooling effect by the turbulence generation ridges 20 can be obtained. In other words, the air in the mold is allowed to escape to the outer-side in the tire-radial direction more easily, so that each turbulence generation ridge 20 can be prevented from being shaped in a poor shaped at the time of curing.

In addition, the top surface 21A of the outer-side end portion 21 of each turbulence generation ridge 20 is on the same plane as the surface of the corresponding tire side portion 3. Accordingly, when a green tire is cured in the mold, the air in the mold can escape more easily to a portion where vent holes (not illustrated), which are the opening for the air in the mold to escape therethrough, are formed. Thus, improper transfer of heat to the turbulence generation ridges 20 at the time of curing, which may result in uncured turbulence generation ridges 20, can be prevented. In addition, the invention can prevent the outer-side end portions to be damaged while the tire is travelling.

In addition, since having each end portion formed as a gently sloping portion, each turbulence generation ridge 20 can be prevented from being chipped or dropped-off. Moreover, since including a steeply sloping portion, each turbulence generation ridge 20 can secure a certain height in the vicinity of each end portion. Accordingly, the cooling effect by the turbulence generation can be obtained also in the vicinity of each end portion of the turbulence generation ridge 20.

In addition, the top surface 22A of the inner-side end portion 22, in the tire-radial direction, of each turbulence generation ridge 20 is smoothly contiguous to the surface (the surface of the corresponding tire side portion 3) raised from the bead portion 4. Accordingly, when a green tire is cured in the mold, the inner-side end portions 22 of the turbulence generation ridges 20 are chipped or dropped off less frequently, and bare is less likely to occur.

In addition, the non-contact region B is the region located at the inner side, in the tire-radial direction, of the inner-side end portion, in the tire-radial direction, of the ridge-processing region (including letter-forming region) A or the region located at the inner side, in the tire-radial direction, of the innermost position, in the tire-radial direction, of the letter portion. Accordingly, the non-contact region B does not interfere with the ridge-processing region or with the letter portion while the turbulence generation ridges 20 can be formed without being chipped nor dropped off.

In addition, in a run-flat tire equipped with a reinforcement rubber having a crescent-shaped cross section taken in the tire-radial direction, the turbulence generation ridges 20 are chipped or dropped off less frequently, and bare is less likely to occur. As a result the tire thus manufactured has a high durability against the generated heat.

Example Case B

Next, Example Case B will be described. Durability drum testing was conducted and whether bare defects occurred or not after the tires were formed by molding was checked. The tires of Conventional Example, Comparative Examples 10 to 13, and Examples 10 to 14 were subjected to the testing and the checking conducted under the conditions given below. The results of the durability drum testing (durability evaluations) are expressed by indexes representing the mileage until the occurrence of failure. Table 2 shows the results.

TABLE 2

| Parameter | Conventional Example no ridges | Comparative Example 10 with ridges | Comparative Example 11 with ridges | Example 10 with ridges | Example 11 with ridges | Example 12 with ridges | Example 13 with ridges | Example 14 with ridges | Comparative Example 12 with ridges | Comparative Example 13 with ridges |
|---|---|---|---|---|---|---|---|---|---|---|
| Gradually Decreasing Angle θ of Outer-Side End Portion in Radial-Direction of Ridges | — | 70 | 45 | 40 | 30 | 30 | 30 | 10 | 30 | 30 |
| p/h (—) of Ridges | — | 12 | 12 | 12 | 12 | 12 | 12 | 12 | 12 | 12 |
| MAX Height of Ridges (mm) | — | 2 | 2 | 2 | 1 | 2 | 5 | 2 | 0.5 | 7 |
| RFT Drum Durability | 56 | 100 | 100 | 100 | 100 | 100 | 100 | 96 | 58 | 62 |
| Whether bare defect exists | — | exists all around | exists all around | not exist all around | not exist all around | not exist all around | not exist all around | not exist all around | not exist all around | not exist all around |

Here, Conventional Example was a run-flat tire without any turbulence generation ridges 20. Comparative Example 10 had a 70° gradually-decreasing angle θ of the outer-side end portion 21A of each turbulence generation ridge 20. Comparative Example 11 had a 45° gradually-decreasing angle. Comparative Example 12 had a 30° gradually-decreasing angle and a 0.5-mm height of each outer-side end portion 21. Comparative Example 13 had a 30° gradually-decreasing angle and a 7-mm height of each outer-side end portion 21. Each of Examples 10 to 14 and Comparative Examples 10 to 13 had a p/h value of 12.

Conditions set for the run-flat tires are given below.
Tire size: 285/50R18
Applied Rim: 8.0 JJ×20
(Durability Test)
Internal Pressure: 0 kPa
Load: 9.8 kN
Speed: 90 km/h Durability drum testing was conducted under such conditions, and the durability in terms of the mileage until the occurrence of failure is expressed by indexes.

(Bare Defect Evaluation)

The evaluation was based on the determination whether bare defects could be observed or not in the appearances of the turbulence generation ridges of each run-flat tire. As Table shows, in each of Comparative Examples 10 and 11, the gradually-decreasing angle of the outer-side end portion 21 was larger than 40°, and bare defects could be observed all around the tire. In contrast, in each of Examples 10 to 14, the gradually-decreasing angle was 40° or smaller, and bare defects could be observed nowhere around the tire. In each of Comparative Examples 12 and 13, the outer-side end portion 21 had a height that is not within the range from 1 mm to 5 mm, and turbulence-generating effect or turbulence-accelerating effect was so low that the durability was impaired.

(Other Embodiments)

The description and the drawings of the above-described embodiments are parts of the disclosure, but are not understood to limit the invention. It will be apparent for those skilled in the art to conceive of various alternative embodiments, examples, and application techniques from this disclosure.

For example, though each of the turbulence generation ridges 20 of the above-described embodiments has a shape of a narrow and lengthy box, but may have the section taken in the tire-circumferential direction in a trapezoidal shape or other shapes. In addition, although extending substantially in the tire-radial direction, each turbulence generation ridge 20 may be formed to have an angle oblique with respect to the tire-radial direction.

In addition, each of the turbulence generation ridges 20 and 30 may be formed so that the width thereof can become gradually narrower and narrower towards the outer side in the tire-radial direction. The effect to push the rubber outwards in the tire-radial direction at the time of forming the tire by the mold can be obtained also in this case. Accordingly, the effect to reduce the occurrence of bare defects can be obtained by pushing out the air outwards in the tire-radial direction.

In addition, in the above-described embodiments, the invention is applied to a run-flat tire as an example of pneumatic tire, but the invention is of course applicable to tires of other types such as an off-the-road radial (ORR) tire and a truck-bus radial (TBR) tire.

INDUSTRIAL APPLICABILITY

As has been described thus far, the pneumatic tire of the invention can maintain high effect to lower the temperatures of the tire side portions and, at the same time, reduce the increase in the tire weight and in the rolling resistance. Accordingly, the invention is useful in the field of pneumatic-tire manufacturing technique.

The invention claimed is:

1. A vulcanized pneumatic tire comprising a plurality of turbulence generation ridges which extend on a surface of a tire side portion in a tire-radial direction and which are arranged at a pitch in a tire-circumferential direction,
    the surface on the tire side portion including a maximum width position and narrower width portions provided radially inside of and radially outside of the maximum width position; the maximum width position being a position of the surface on the tire side portion that is farthest in a horizontal direction from a tire equatorial plane;
    wherein a relationship $Si > So$ is satisfied where $Si$ is the sum of sidewall areas of all the turbulence generation ridges located at the inner side, in the tire-radial direction, of the maximum width position of the pneumatic tire and $So$ is the sum of sidewall areas of all the turbulence generation ridges located at the outer side, in the tire-radial direction, of the tire maximum width position, and wherein $Si$ and $So$ are both non-zero,
    wherein the number of the turbulence generation ridges located at the inner side, in the tire-radial direction, of the tire maximum width position is larger than the number of the turbulence generation ridges located at the outer side, in the tire-radial direction, of the tire maximum width position,
    wherein the turbulence generation ridges located at the inner side, in the tire-radial direction, of the tire maximum width position are equidistantly arranged in the tire-circumferential direction,
    wherein the turbulence generation ridges located at the inner side in the tire-radial direction, of the tire maximum width position satisfy $1.0 \leq p/h \leq 50.0$,
    where h is a maximum height of each of the turbulence generation ridges from the surface of the tire side portion located at the inner side in the tire-radial direction, of the tire maximum width position, and
    p is a pitch between positions of each adjacent two of the turbulence generation ridges, located at the inner side, in the tire-radial direction, of the tire maximum width position, the positions each being a point having the maximum height h; and
    a maximum height of each of the turbulence generation ridges from the surface of the tire side portion located at the outer side is equal to the maximum height h;
    a pitch between the positions of each adjacent two of the turbulence generation ridges is constant in the outer side;
    wherein each of the turbulence generation ridges located at outer side is radially aligned with a respective turbulence generation ridge located at the inner side.

2. The pneumatic tire according to claim 1 wherein a largest area of a portion which is in a region located in the surface of the tire side portion and located at the outer side, in the tire-radial direction, of the tire maximum width position, and in which no turbulence generation ridges are formed is an area having an angle of 90° or smaller around a tire rolling axis.

3. The pneumatic tire according to claim 1 wherein a maximum height of each of the turbulence generation ridges is within a range from 1 mm to 5 mm measured from the surface of the tire side portion.

4. The pneumatic tire according to claim 1 wherein the tire side portion includes a reinforcement rubber that has a crescent-shaped cross-section taken in the tire-radial direction.

5. The pneumatic tire according to claim 1 wherein $10 \leq p/h \leq 20$.

6. The pneumatic tire according to claim 1 wherein $1 \leq (p-w)/w \leq 100$, wherein w is a width of each of the turbulence generation ridges.

7. The pneumatic tire according to claim 1, wherein a circumferential width of each of the inner protrusions and the outer protrusions is the same.

8. The pneumatic tire according to claim 1, wherein each of the turbulence generation ridges in the outer side are continuous with a respective turbulence ridge in the inner side.

9. The pneumatic tire according to claim 1, wherein the turbulence generation ridges are formed only at the surface of a tire side portion.

10. A vulcanized pneumatic tire comprising a plurality of turbulence generation ridges which extend on a surface of a tire side portion in a tire-radial direction and which are arranged at a pitch in a tire-circumferential direction,
    wherein a relationship Si>So is satisfied where Si is the sum of sidewall areas of all the turbulence generation ridges located at the inner side, in the tire-radial direction, of a maximum width position of the pneumatic tire and So is the sum of sidewall areas of all the turbulence generation ridges located at the outer side, in the tire-radial direction, of the tire maximum width position, and wherein Si and So are both non-zero,
    wherein the number of the turbulence generation ridges located at the inner side, in the tire-radial direction, of the tire maximum width position is larger than the number of the turbulence generation ridges located at the outer side, in the tire-radial direction, of the tire maximum width position,
    wherein the turbulence generation ridges located at the inner side, in the tire-radial direction, of the tire maximum width position are equidistantly arranged in the tire-circumferential direction,
    wherein the turbulence generation ridges located at the inner side in the tire-radial direction, of the tire maximum width position satisfy $1.0 \leq p/h \leq 50.0$,
    where h is a maximum height of each of the turbulence generation ridges from the surface of the tire side portion located at the inner side in the tire-radial direction, of the tire maximum width position, and
    p is a pitch between positions of each adjacent two of the turbulence generation ridges, located at the inner side, in the tire-radial direction, of the tire maximum width position, the positions each being a point having the maximum height h; and
    a maximum height of each of the turbulence generation ridges from the surface of the tire side portion located at the outer side is equal to the maximum height h;
    wherein at least one of an end portion, on the inner side in the tire-radial direction, of each turbulence generation ridge and an end portion, on the outer side in the tire-radial direction, of the turbulence generation ridge is formed to have a height gradually decreasing toward the at least one end portion;
    wherein each of the turbulence generation ridges located at outer side is radially aligned with a respective turbulence generation ridge located at the inner side.

11. The pneumatic tire according to claim 10 wherein a top surface of the end portion of each of the turbulence generation ridges is formed as a sloping surface that is sloping with respect to the surface of the tire side portion.

12. The pneumatic tire according to claim 11 wherein an angle formed by a tangent to the sloping surface and the surface of the tire side portion is within a range from 10° to 40°.

13. A vulcanized pneumatic tire comprising a plurality of turbulence generation ridges which extend on a surface of a tire side portion in a tire-radial direction and which are arranged at a pitch in a tire-circumferential direction,
    the surface on the tire side portion including a maximum width position and narrower width portions provided radially inside of and radially outside of the maximum width position; the maximum width position being a position of the surface on the tire side portion that is farthest in a horizontal direction from a tire equatorial plane;
    wherein a relationship Si>So is satisfied where Si is the sum of sidewall areas of all the turbulence generation ridges located at the inner side, in the tire-radial direction, of the maximum width position of the pneumatic tire and So is the sum of sidewall areas of all the turbulence generation ridges located at the outer side, in the tire-radial direction, of the tire maximum width position, and wherein Si and So are both non-zero,
    wherein the number of the turbulence generation ridges located at the inner side, in the tire-radial direction, of the tire maximum width position is larger than the number of the turbulence generation ridges located at the outer side, in the tire-radial direction, of the tire maximum width position,
    wherein the turbulence generation ridges located at the inner side, in the tire-radial direction, of the tire maximum width position are equidistantly arranged in the tire-circumferential direction,
    wherein the turbulence generation ridges located at the inner side in the tire-radial direction, of the tire maximum width position satisfy $1.0 \leq p/h \leq 50.0$,
    where h is a maximum height of each of the turbulence generation ridges from the surface of the tire side portion located at the inner side in the tire-radial direction, of the tire maximum width position, and
    p is a pitch between positions of each adjacent two of the turbulence generation ridges, located at the inner side, in the tire-radial direction, of the tire maximum width position, the positions each being a point having the maximum height h; and
    a maximum height of each of the turbulence generation ridges from the surface of the tire side portion located at the outer side is equal to the maximum height h;
    the turbulence generation ridges in the outer side are separated from the turbulence ridges in the inner side;
    wherein each of the turbulence generation ridges located at outer side is radially aligned with a respective turbulence generation ridge located at the inner side.

14. The pneumatic tire according to claim 13 wherein a largest area of a portion which is in a region located in the surface of the tire side portion and located at the outer side, in the tire-radial direction, of the tire maximum width position, and in which no turbulence generation ridges are formed is an area having an angle of 90° or smaller around a tire rolling axis.

15. The pneumatic tire according to claim 13 wherein a maximum height of each of the turbulence generation ridges is within a range from 1 mm to 5 mm measured from the surface of the tire side portion.

16. The pneumatic tire according to claim 13 wherein the tire side portion includes a reinforcement rubber that has a crescent-shaped cross-section taken in the tire-radial direction.

17. The pneumatic tire according to claim 13 wherein $10 \leq p/h \leq 20$.

18. The pneumatic tire according to claim 13 wherein $1 \leq (p-w)/w \leq 100$, wherein w is a width of each of the turbulence generation ridges.

19. The pneumatic tire according to claim 13, wherein a circumferential width of each of the inner protrusions and the outer protrusions is the same.

20. The pneumatic tire according to claim 13, wherein the turbulence generation ridges are formed only at the surface of a tire side portion.

* * * * *